United States Patent
Hammond et al.

(10) Patent No.: US 7,082,541 B2
(45) Date of Patent: Jul. 25, 2006

(54) SYSTEM AND METHOD FOR MANAGING UNINTERRUPTIBLE POWER SUPPLY SYSTEMS

(75) Inventors: Brad Hammond, North Kingstown, RI (US); Carl J. Meiser, III, East Greenwich, RI (US); Todd Giaquinto, North Kingstown, RI (US); Catherine Murphy, Warwick, RI (US); Dan Redmond, Bradford, RI (US)

(73) Assignee: American Power Conversion Corporation, West Kingston, RI (US)

( * ) Notice: Subject to any disclaimer, the term of this patent is extended or adjusted under 35 U.S.C. 154(b) by 0 days.

(21) Appl. No.: 10/806,482

(22) Filed: Mar. 22, 2004

(65) Prior Publication Data

US 2005/0071699 A1    Mar. 31, 2005

Related U.S. Application Data

(63) Continuation of application No. 09/559,983, filed on Apr. 26, 2000, now abandoned.

(51) Int. Cl.
*G06F 1/26* (2006.01)
*G06F 15/16* (2006.01)

(52) U.S. Cl. ...................................... 713/300; 709/202
(58) Field of Classification Search ................ 713/300; 709/202, 229
See application file for complete search history.

(56) References Cited

U.S. PATENT DOCUMENTS 5,319,571 A * 6/1994 Langer et al. .............. 713/300
5,381,554 A * 1/1995 Langer et al. ................ 714/14
5,745,670 A * 4/1998 Linde ........................... 714/22
5,842,027 A * 11/1998 Oprescu et al. ............. 713/300
5,949,974 A * 9/1999 Ewing et al. ................ 709/202
5,961,604 A * 10/1999 Anderson et al. ........... 709/229
6,396,391 B1 * 5/2002 Binder ................... 340/310.01
6,629,247 B1 * 9/2003 Hall et al. ................... 713/300

FOREIGN PATENT DOCUMENTS

JP          11-259185      *  9/1999
JP          2000-078224    *  3/2000

OTHER PUBLICATIONS

"A Software Managing Clustered Multi Vender Uninterruptible Power Supply on Network", Research Disclosure, Mar. 1999, XP-002180281.*

* cited by examiner

*Primary Examiner*—Chun Cao
(74) *Attorney, Agent, or Firm*—Mintz Levin Cohn Ferris Glovsky & Popeo, PC.

(57) ABSTRACT

An Internet-based system and method is set forth for managing a number of uninterruptible power supply systems. The system includes an uninterruptible power supply manager computer coupled to a number of user computers via a computer network. The manager computer is further coupled to the number of uninterruptible power supply systems via the computer network. The manager computer can communicate with the number of uninterruptible power supply systems to obtain inventory and/or status information related to each of the uninterruptible power supply systems. The inventory and/or status information is contained in a database defined on the manager computer. An inventory engine, which is included in the computer manager, can configure and arrange the inventory and/or status information into a number of reports.

12 Claims, 24 Drawing Sheets

Inventory Report: Unavailable Devices        Inventory Manager
                                             Generation Date: 03/15/2000

This report identifies and describes the UPS systems that did not respond to the last data update. The information provided about the UPS systems was stored in the database during the last update to which each UPS did respond.

Total number of devices not responding        3 Devices

DNS Name      159.215.13.70                   IP Address     159.215.13.70
Serial #      FB9822532588                    UPS Name       BP280
UPS Model     BACK-UPS PRO 280                Firmware Rev   10.1.D
Last Update   03/07/2000  12:57:09 PM
Contact       T & E
Location      Software Lab WKRI DNS Name      159.215.11.134                  IP Address     159.215.11.134
Serial #      20033435                        UPS Name       UPS_IDEN
UPS Model     Smart-UPS 400                   Firmware Rev   4QD
Last Update   03/07/2000  4:07:20 PM
Contact
Location DNS Name      159.215.13.75                   IP Address     159.215.13.75
Serial #      ED9833002438                    UPS Name       TEST

Figure 14

Preview 10 to 20%

UPS's at 10 to 20% load

| | | | |
|---|---|---|---|
| % Load | 11.00% | | |
| Serial # | NS9851165147 | Runtime | 95 minutes |
| UPS Model | SMART-UPS 700 | IP Address | 159.215.12.33 |
| Firmware Rev | GWD | UPS Name | UPS_IDEN |
| DNS Name | 159.215.12.33 | | |
| Contact | Unknown | | |
| Location | Unknown | | |

| | | | |
|---|---|---|---|
| % Load | 12.00% | | |
| Serial # | XS9851013429 | Runtime | 89 minutes |
| UPS Model | SMART-UPS 1400 RM | IP Address | 192.9.237.3 |
| Firmware Rev | 72.11.D | UPS Name | UPS_IDEN |
| DNS Name | 192.9.237.3 | | |
| Contact | Unknown | | |
| Location | Unknown | | |

| | | | |
|---|---|---|---|
| % Load | 12.00% | | |
| Serial # | XS9851013429 | Runtime | 89 minutes |
| UPS Model | SMART-UPS 1400 RM | IP Address | 192.9.237.4 |
| Firmware Rev | 72.11.D | UPS Name | UPS_IDEN |
| DNS Name | 192.9.237.4 | | |
| Contact | Unknown | | |

SYSTEM AND METHOD FOR MANAGING UNINTERRUPTIBLE POWER SUPPLY SYSTEMS

CROSS-REFERENCE TO RELATED APPLICATIONS

This application is a continuation application under 37 CFR §1.53(b) of U.S. Ser. No. 09/559,983, filed on Apr. 26, 2000 now abandoned, entitled SYSTEM AND METHODS FOR MANAGING UNINTERRUPTIBLE POWER SUPPLY SYSTEMS.

FIELD OF THE INVENTION

The present invention relates generally to a system and method for managing a number of uninterruptible power supply systems, and more specifically to a system and method for managing a number of uninterruptible power supply systems based on inventory and/or status information related to each uninterruptible power supply system.

BACKGROUND

The use of uninterruptible power supply ("UPS") systems having battery back-up systems to provide regulated, uninterrupted power for sensitive and/or critical loads, such as computer systems, and other data processing systems is well known. Today there are many thousands of these UPS systems in operation. Many of these UPS systems require preventative maintenance, such as battery inspections and/or replacement, to avoid system failures. Technicians ordinarily visit a site, where a UPS system resides, to obtain status information related to the UPS system and to perform system inspection and maintenance. A particular business or industry may have a number of sites residing throughout the country and each site may employ a number of UPS systems. Thus, it can be logistically impractical for a technician to maintain and inspect these UPS systems which reside at numerous sites throughout the country. In some circumstances, a UPS system failure can occur during the interim between scheduled UPS system inspection and maintenance. A UPS system failure can be particularly catastrophic where the UPS system is protecting one or more critical computer systems, the loss of power to which can result in unrecoverable data loss.

Therefore, an unsolved need remains for a system and method for managing a number of UPS systems that overcomes the above described limitations and deficiencies of the prior art.

SUMMARY OF THE INVENTION

In accordance with principles of the present invention, a system for managing a number of UPS systems comprises a UPS manager computer coupled to a number of user computers via an internet-based computer network system. The manager computer is further coupled to the number of UPS systems via the computer network system. The manager computer can communicate with the number of UPS systems, via the computer network system, to obtain inventory and/or status information related to each of the UPS systems.

In an embodiment of the present invention, the manager computer comprises a processor, a storage medium and a database which can be defined on the storage medium. The database can contain the inventory and/or status information related to each of the UPS systems. The manager computer further comprises an inventory engine. The inventory engine can configure and arrange the inventory and/or status information contained in the database into a number of reports.

In another embodiment of the present invention, a method for managing a number of UPS systems comprises steps of providing a user personal identification number from one or more user computers to a manager computer; establishing a communication link between one or more of the user computers and the manager computer based on the user personal identification number; requesting the manager computer to provide a UPS system status; electing to configure a database; electing a number of internet-protocol addresses and entering the number of internet-protocol addresses in predetermined address fields, the internet-protocol addresses being associated with the number of UPS systems; requesting the manager computer to obtain inventory and/or status information related to each UPS system associated with each internet-protocol address; and storing the inventory and/or status information in the database defined on the manager computer.

The method of managing a number of UPS systems may further include a step of configuring and arranging the inventory and/or status information, which is defined in the database, into a number of reports.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 1b is an exploded schematic block diagram of a portion of the system shown in FIG. 1a;

FIG. 2a is a flow chars owing process steps executable on the system shown in FIG. 1a;

FIG. 2b is a flow chart providing additional process steps for the flow chart shown in FIG. 2a;

FIG. 2c is a flow chart providing additional process steps for the flow chart shown in FIG. 2a;

FIG. 4b is a range IP address tab opened from the Device List Web-page shown in FIG. 4a;

FIG. 4c is a subnet IP address tab opened from the Device List Web-page shown in FIG. 4a;

FIG. 14 is another exemplary Inventory Report including device unavailability information;

FIG. 19 is an exemplary Battery Status Report including UPS load details for the report shown in FIG. 18.

DETAILED DESCRIPTION

Embodiments of the present invention are described herein with reference to an Internet-based system and method for managing a number of UPS systems. However, as understood by one skilled in the art, the present invention is not limited to Internet-based systems and may include systems employing other computer networks as well as stand-alone systems.

Figure 1A:
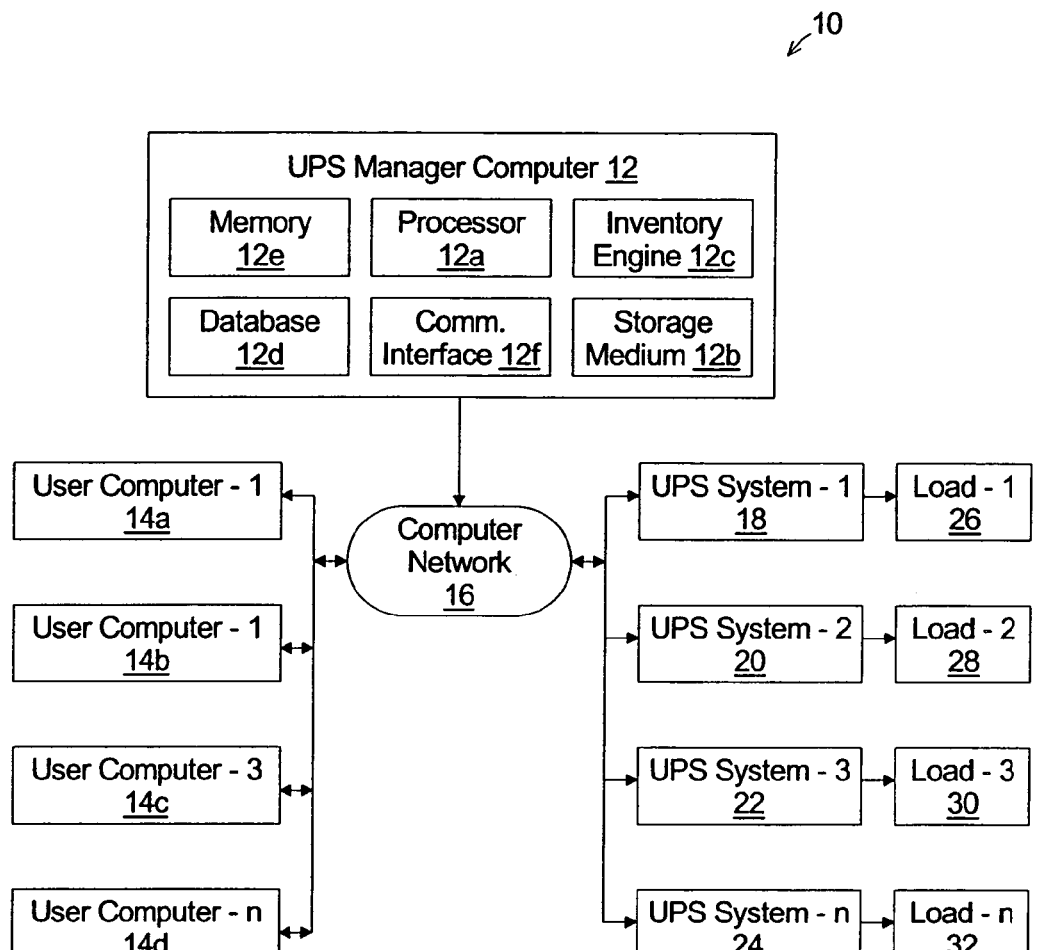
FIG. 1a is a schematic block diagram of a system in accordance with one embodiment of the present invention.

FIG. 1a shows a system 10 for managing a number of UPS systems or devices in accordance with one embodiment of the present invention. The system 10 includes a UPS manager computer 12 coupled to a number of user computers, 14a, 14b, 14c and 14d, via a computer network 16 such as the Internet. The UPS manager computer 12 is further coupled to a number of UPS systems 18, 20, 22 and 24, via the computer network 16. The user computers 14a, 14b, 14c and 14d, can be conventional personal computers and/or workstations. Each of the user computers 14a, 14b, 14c and 14d includes conventional hardware and software that permit communication with the UPS manager computer 12 via the computer network 16. The UPS systems 18, 20, 22 and 24 provide regulated uninterruptible power to loads 26, 28, 30 and 32 respectively.

The UPS manager computer 12 can comprise a conventional computer server such as an "NT-Server" or "NT Workstation". These computer servers may be programmed with conventional server software such as: "Windows Explorer", "Netscape Enterprise", or "Navigator." Furthermore, these computer servers may be programmed with conventional Web page interface software such as: "Visual Basic", "Java", "JavaScript", "HTML/DHTML", "C++", "J++", "Perlscript", or "ASP".

In an embodiment of the present invention and as shown in FIG. 1a, the UPS manager computer 12 is an NT-Server. The NT-server includes a processor 12a, storage medium 12b, such as a magnetic disk drive, inventory engine 12c, database 12d, memory 12e and communication interface 12f. The inventory engine 12c can communicate with the number of UPS systems, via the communication interface 12f, to obtain inventory and/or status information related to each UPS system. The inventory and/or status information received from each UPS system can be stored in the database 12d defined on the UPS manager computer 12. The inventory engine 12c can further configure and arrange the inventory and/or status information, which is stored in the database 12d, into a number of reports.

In an embodiment of the present invention, the inventory and/or status information received from the UPS systems 18, 20, 22 and/or 24, and stored in the database 12d can include: UPS model, UPS location, UPS internet protocol ("IP") address, UPS age, UPS battery age and/or UPS availability. The database 12d can further store battery status information including, but not limited to: battery self test results, replace battery status, battery status by load and/or battery status by runtime remaining.

Each of the UPS systems 18, 20, 22 and 24, can be a conventional UPS system. In an embodiment of the present invention, UPS systems provided by American Power Corporation, of Kingston, R.I., which are sold under the trade names Smart-UPS, Symmetra, Silicon, and Matrix, can be used as UPS systems 18, 20, 22 and 24.

Figure 1B:
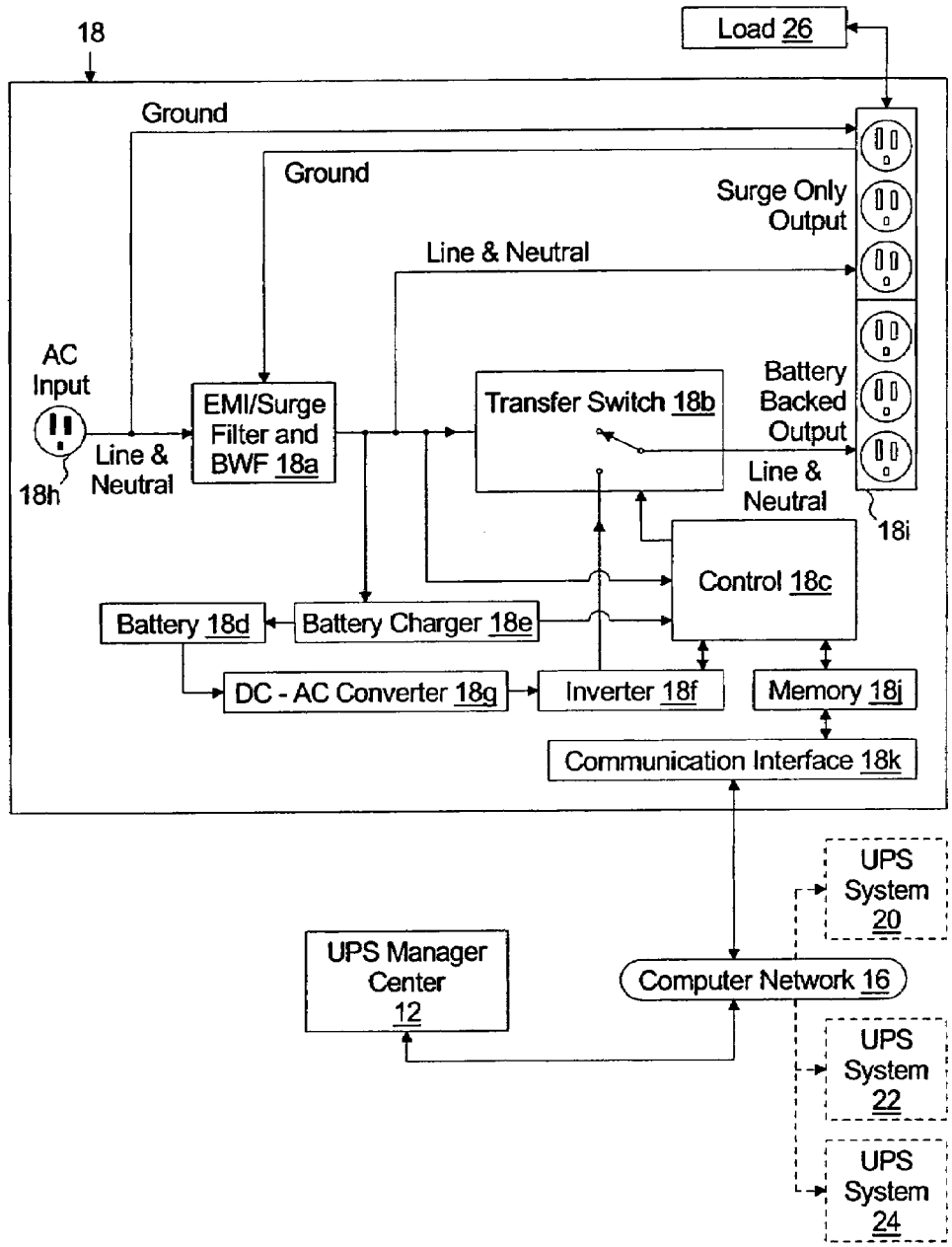

FIG. 1b shows an exploded view of the UPS system 18 shown in FIG. 1a. As shown in FIG. 1b, the UPS system 18 includes an input filter/surge protector 18a, a transfer switch 18b, a controller 18c, a battery 18d, a battery charger 18e, an inverter 18f, and a DC-DC converter 18g. The UPS system 18 also includes an input 18h for coupling to an AC power source (not shown) and an outlet 18i for coupling to the load 26. A memory device 18j and communication interface 18k are also included in the UPS system 18. The memory device can be used to store the inventory and/or status information as well as other diagnostic information related to the UPS system 18. The communication interface 18k is configured and arranged to enable bi-directional communication between the UPS system 18 and the UPS manager computer 12 via the computer network 16.

In operation of the UPS system 18, the filter/surge protector 18a receives input AC power from the AC power source through the input 18h, filters the input AC power and provides filtered AC power to the transfer switch 18b and the battery charger 18e. The transfer switch 18b receives the AC power from the filter/surge protector 18a and also receives AC power from the inverter 18f. The controller 18c determines whether the AC power available from the filter/surge protector is within predetermined tolerances, and if so, controls the transfer switch to provide the AC power from the filter/surge protector 18a to the outlet 18i. If the AC power from the rectifier is not within the predetermined tolerances, which may occur because of "brown out," "high line," or "black out" conditions, or due to power surges, then the controller 18c controls the transfer switch 18b to provide the AC power from the inverter 18f. The DC-DC converter 18g is an optional component that converts the output of the battery 18d to a voltage that is compatible with the inverter 18f. Depending on the particular converter 18f and battery 18d used, the inverter 18f may be operatively coupled to the battery 18d either directly or through a DC-DC converter 18g.

The controller further provides the memory 18j with system status information, such as the length of time the outlet 18i has been supplied by the battery 18d, as well other related information. The memory 18j stores the system status information as well as inventory data initially programmed into memory 18j by the manufacturer of the UPS system. The communication interface 18k can communicate with the memory 18j to obtain the inventory and/or system status information. The inventory and/or system status information can be further communicated to the UPS manager computer 12 via computer network 16 for further processing.

Figure 2A:
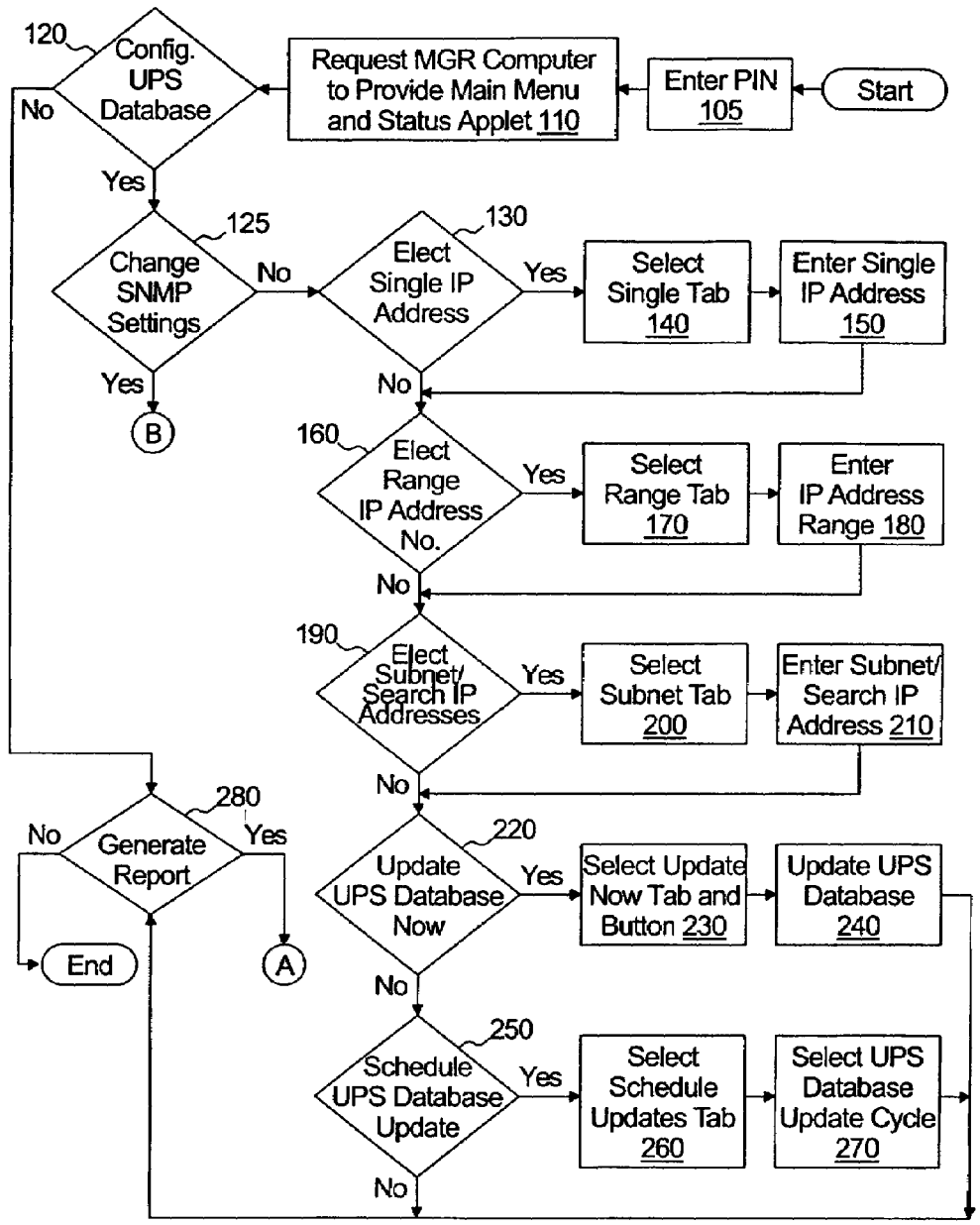
Figure 3:
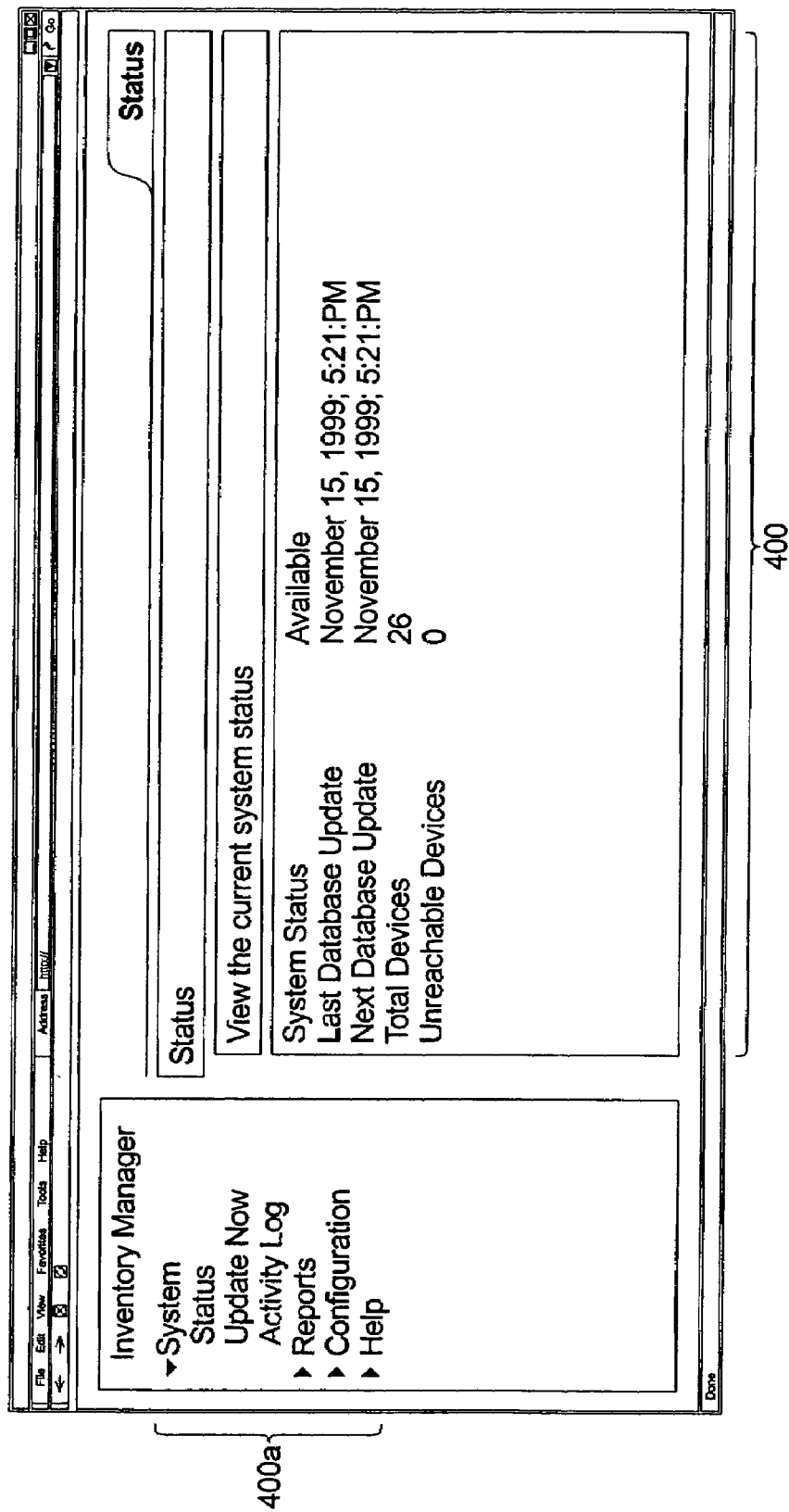
FIG. 3 is an exemplary system Status Web-page.

Referring further to FIGS. 1a, 2a and 3, a method 100 for using the system 10 for managing the number of UPS systems 18, 20, 22 and 24, in accordance with embodiments of the present invention comprises the steps of establishing a communication link between a manager computer 12 and one or more of the user computers 14a, 14b, 14c, or 14d, which are operated by a user. The UPS manager computer 12 can thereafter present one or more of the user computers 14a, 14b, 14c, or 14d with a personal identification number ("PIN") dialog box (not shown). At step 105 of FIG. 2a, the user can enter a predetermined PIN into the PIN dialog box. After the PIN is validated, the user can be granted access to the manager computer 12. The user's PIN is associated with predetermined user information previously stored in the computer manager 12 which enables the computer manger to identify a particular user and grants that user access to the UPS manager computer 12.

After granting one or more of the user computers 14a, 14b, 14c or 14d access to the UPS manager computer 12, the user thereof can request the manager computer, at step 110 of FIG. 2a, to provide the user computer 14a, 14b, 14c or 14d, with a Status Web-page and Main Menu. FIG. 3 shows a Status Web-page 400 and the Main Menu 400a used in one embodiment of the present invention. The user can elect to configure an inventory and/or status information database 12d at step 120 of FIG. 2a, by selecting the Configuration tab of the Main Menu 400a.

Figure 4A:
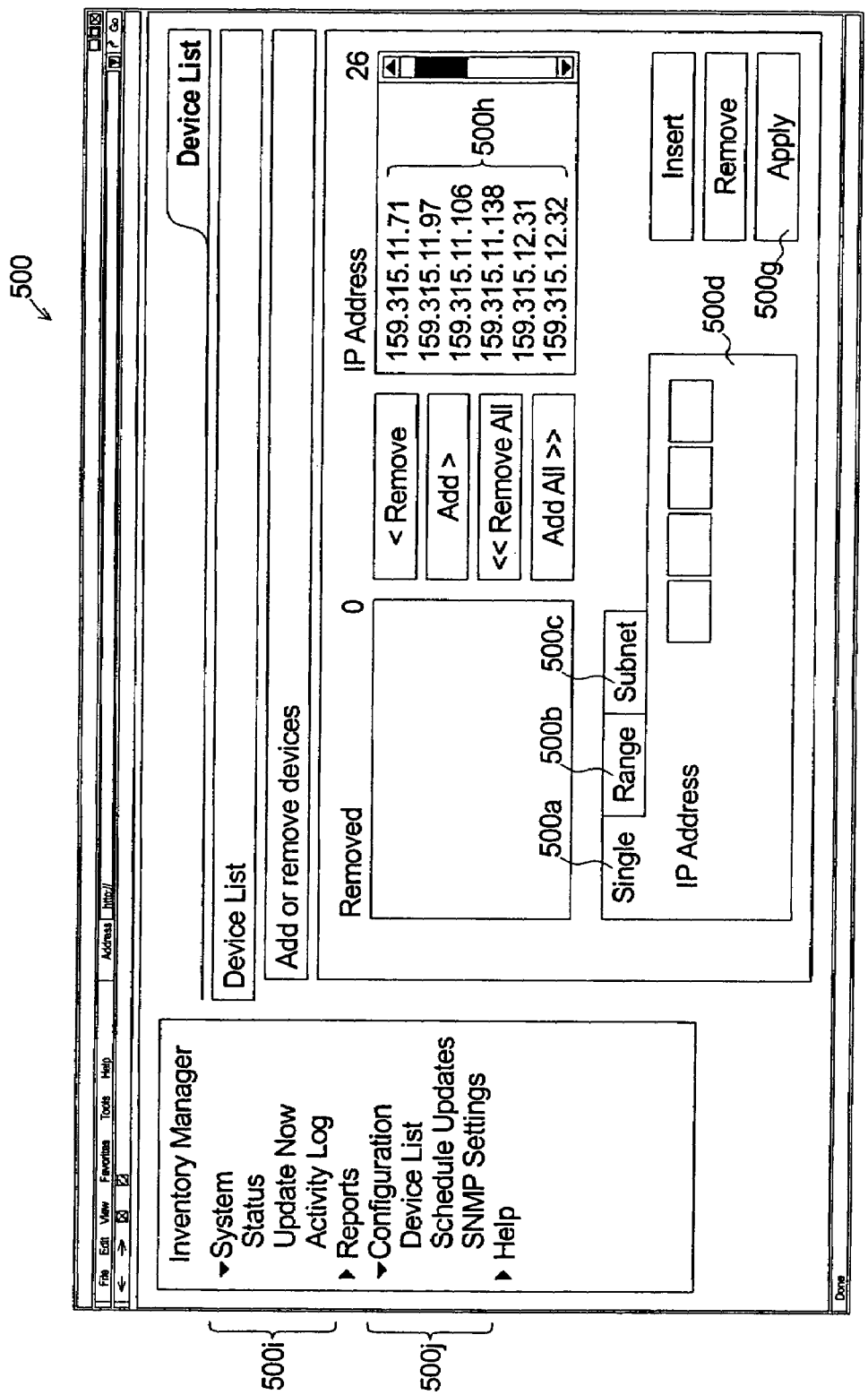
FIG. 4a is an exemplary Device List Web-page with a Single IP address tab selected.
Figure 4B:
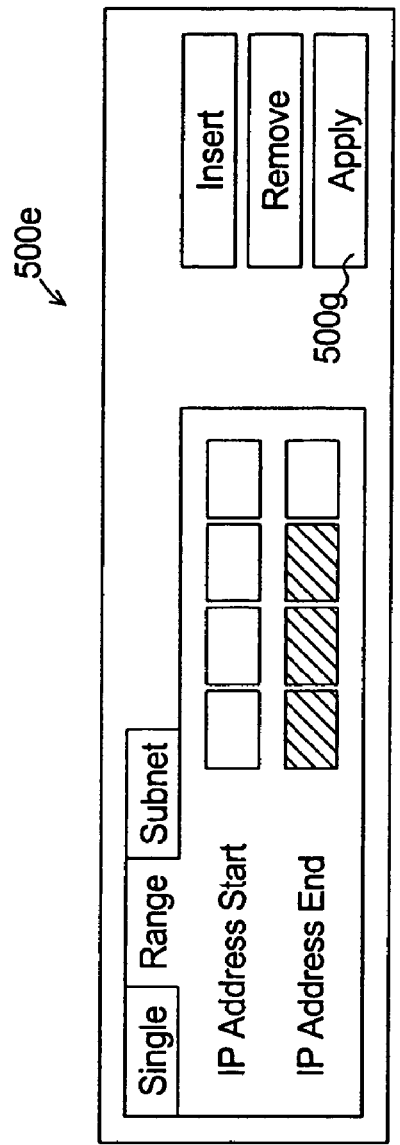
Figure 4C:
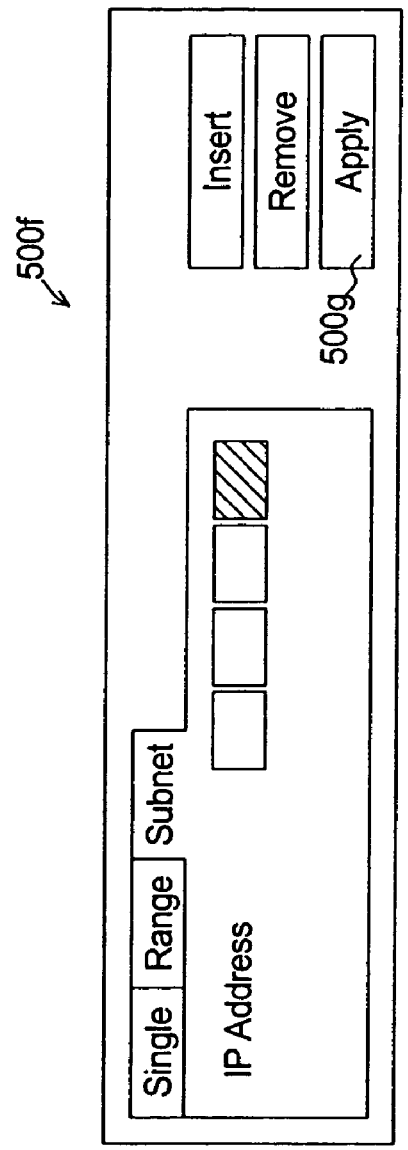
Figure 4D:
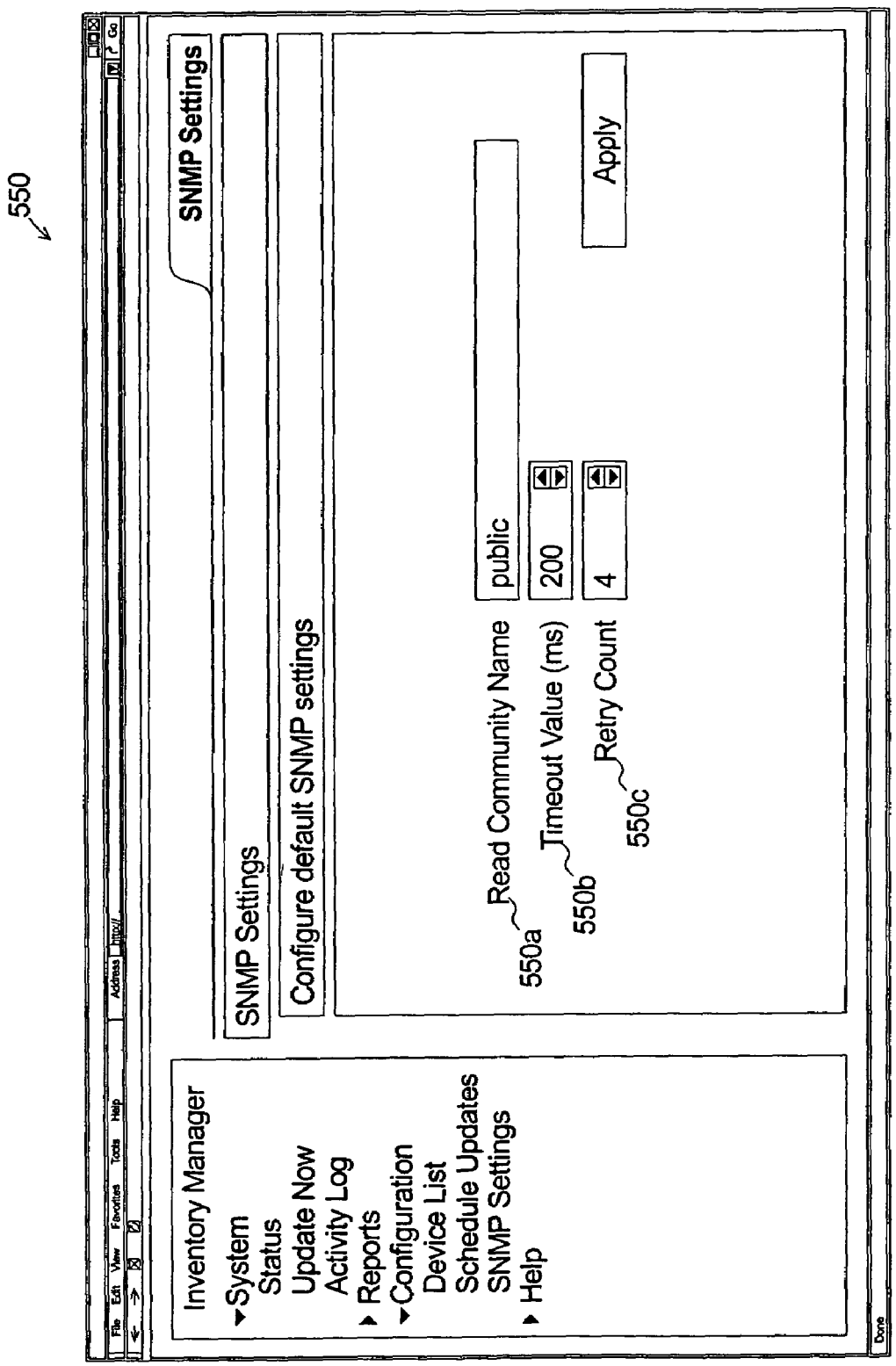
FIG. 4d is an exemplary SNMP Settings Web-page.

Referring to FIGS. 1a, 2a, 2c and 4a, 4b, 4c and 4d, in selecting the Configuration tab (FIG. 3), the user is provided with a Configuration Menu 500j as shown in FIG. 4a. At step 125a of FIG. 2c, the user can select the Simple Network Management Protocol ("SNMP") Settings tab from the Configuration Menu 500j to generate an SNMP Settings Web-page 550 as shown in FIG. 4d. In the SNMP Settings Web-page 550, the user can choose to add or modify their SNMP network parameters as well as their SNMP read community string prior to adding devices to the device list 500h shown in FIG. 4a.

Figure 2B:
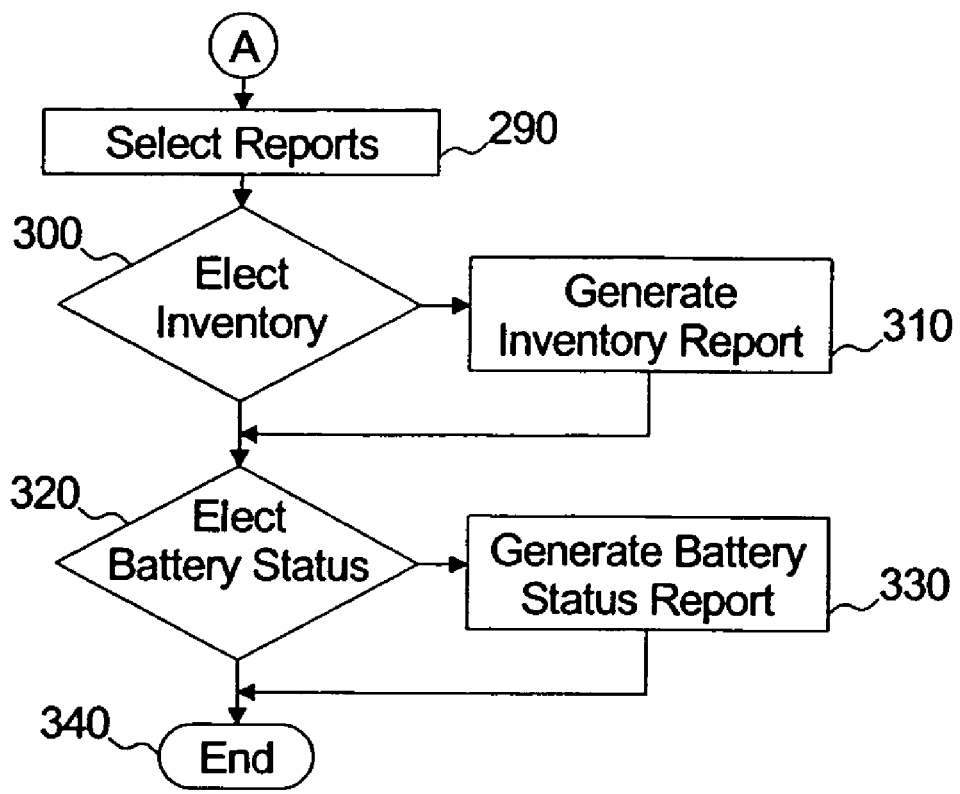
Figure 2C:
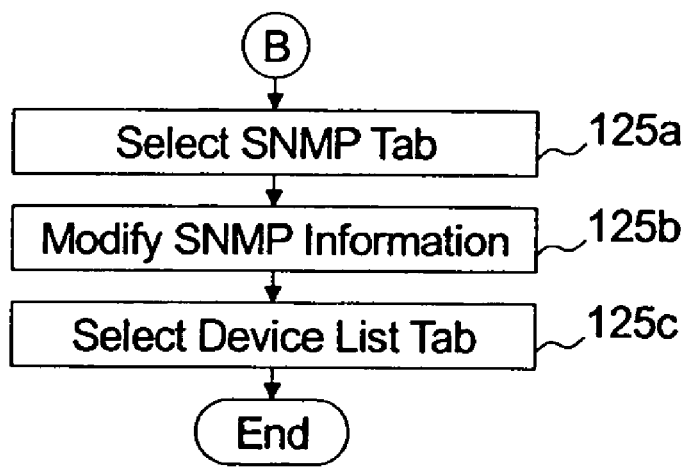

More specifically, the user can modify their SNMP read community string, at step 125b of FIG. 2c, by entering a predetermined read community name, such as "public" (default name), in the Read Community Name dialog box 550a. The predetermined read community name enables the UPS manager computer 12 to communicate with UPS systems 18, 20, 22 and/or 24 that have been configured with the predetermined read community name. For example, if a number of UPS systems 18, 20, 22 and/or 24 are previously configured with the term "public" as a read community name and the Read Community Name dialog box 550a in the SNMP Settings Web-page 550 is also configured with the term "public", then the UPS manager computer 12 can communicate, via SNMP, with the UPS systems 18, 20, 22 and/or 24 which have been similarly configured. On the other hand, if the UPS manager computer 12 communicates with UPS systems 18, 20, 22 and/or 24 which are configured with another read community name, then the Read Community Name dialog box 550a in the SNMP Settings Web-page 550 can be changed by the user to mirror the other read community name. Thereafter, the UPS manager computer 12 can communicate with the UPS systems 18, 20, 22 and/or 24 which are configured with the other read community name.

The Timeout Value drop-down list 550b enables the user to select a period of time for which the UPS manager computer 12 can attempt to communicate with one or more UPS systems 18, 20, 22 and/or 24 before declaring a failed attempt to communicate therewith.

The Retry Count drop-down list 550c enables the user to select a number of retries the UPS manager computer 12 can attempt in the event that a failed attempt to communicate between the UPS manager computer 12 and one or more of the UPS system 18, 20, 22 and/or 24 is declared.

With the SNMP settings appropriately configured and at step 125c of FIG. 2c, the user can select the Device List tab from the Configuration Menu 500j to generate a Device List Web-page 500 as used in one embodiment of the present invention and as shown in FIG. 4a. The Device list Web-page 500 includes a Single tab 500a, a Range tab 500b and a Subnet tab 500c. The user can select anyone of the tabs 500a, 500b or 500c to respectively open a Single IP address dialog box 500d, Range IP address dialog box 500e and Subnet IP dialog box 500f. At step 130 of FIG. 2a, the user can elect to enter a single IP address by selecting, at step 140 of FIG. 2a, the Single tab from the Device List menu 500. In the Single IP address dialog box 500d and at step 150 of FIG. 2a, the user can enter the single IP address in the dialog box 500d. The single IP address, which is entered into the dialog box 500d, is associated with a computer network address for single UPS system 18, 20, 22 or 24. After entering the single IP address into the dialog box 500d and selecting an Apply button 500g, the single IP address will be added to the IP address inventory list 500h.

Alternatively, at step 160 of FIG. 2a, the user can elect to add a contiguous range of IP addresses to the IP address inventory list 500h. The contiguous range of IP addresses is defined by a starting IP address and an ending IP address. At step 170 of FIG. 2a, the user can select the Range tab 500b from the Device List Web-page 500 to open the Range IP address dialog box 500e as shown in FIG. 4b. At step 180 of FIG. 2a, the user can enter the starting IP address and the ending IP address in the Range IP dialog box 500e. After the user enters the starting and ending IP addresses into the Range IP dialog box 500e, the user can select the Apply button 500g to add all contiguous IP addresses, which are defined between the starting and ending addresses, to the IP address inventory list 500h. Prior to adding the entered range of contiguous IP addresses to the inventory list 500h, the Device List Web-page 500 will compare the entered range of IP address's to the existing IP address inventory list 500h looking for and discarding duplicate entries. The Device List Web-page will then present the remaining range of IP addresses to the user for approval. If the user approves the presented range of IP addresses, the computer manager 12 will strobe UPS systems 18, 20, 22 and 24 associated with the approved range of IP addresses to validate the addresses. The validated IP addresses are subsequently stored in the inventory list 500h.

If one or more IP addresses associated with UPS systems are unknown, the user can elect to search for IP addresses at step 190 of FIG. 2a. At step 200 of FIG. 2a, the user can search for the IP addresses by selecting the Subnet tab 500c from the Device List menu 500 shown in FIG. 4a to open the Subnet menu 500f shown in FIG. 4c. At step 210 of FIG. 2a, the user can enter a partial IP address followed by a wildcard symbol, such as an asterisk, in the Subnet menu 500f. After selecting the Apply button 500g from the Subnet dialog box 500f, the Device List Web-page will compare the entered IP addresses to the existing IP address inventory list 500h, looking for and discarding duplicate entries. The Device List Web-page will then present the remaining list of IP addresses to the user for approval. If the user approves the presented list of IP addresses, the computer manager 12 will strobe UPS systems 18, 20, 22 and 24 associated with the approved list of IP addresses to validate the addresses. The validated IP addresses are subsequently stored in the inventory list 500h.

After generating the IP address inventory list 500h, the manager computer 12 can communicate with one or more of the UPS systems 18, 20, 22 or 24 defined at the addresses to obtain inventory and/or status information therefrom. The inventory and/or status information can be stored in database 12d of the computer manage 2 for subsequent use in generating reports.

Figure 5:
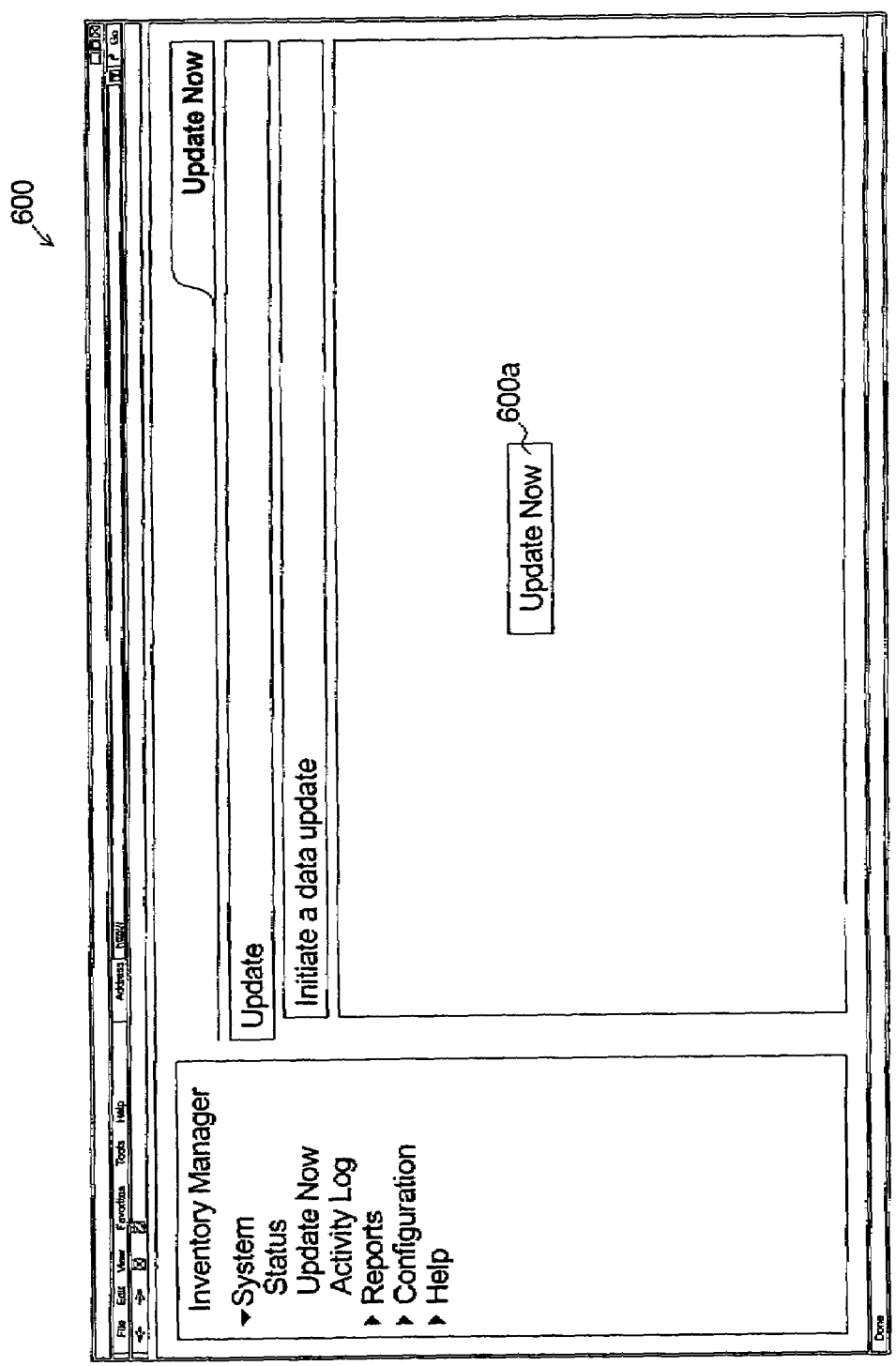
FIG. 5 is an exemplary Update Now Web-page.

Referring to FIGS. 1a, 2a and 5, at step 220 of FIG. 2a and from the Device List Web-page 500 (FIG. 4a), the user can elect to update the database 12d by selecting the Update Now tab from the System Menu 500i. Selecting the Update Now tab from the System Menu 500i opens an Update Now Web-page. FIG. 5 shows an Update Now Web-page 600 in accordance with an embodiment of the present invention. At step 230 of FIG. 2a, the user can update the inventory and/or status information contained in the database 12d by selecting an Update Now button 600a which is defined on the Update Now Web-page 600 as shown in FIG. 5. After selecting the Update Now button 600a, the computer manager 12 will concomitantly communicate with one or more of the UPS systems 18, 20, 22 and/or 24, which are associated with IP addresses defined in the IP address inventory list 500h (FIG. 4a). In communicating with the UPS systems 18, 20, 22 and/or 24, the manager computer 12 can receive and update the database 12d with updated inventory and/or status information related to each UPS system 18, 20, 22 and/or 24, at step 240 of FIG. 2a.

Figure 6:
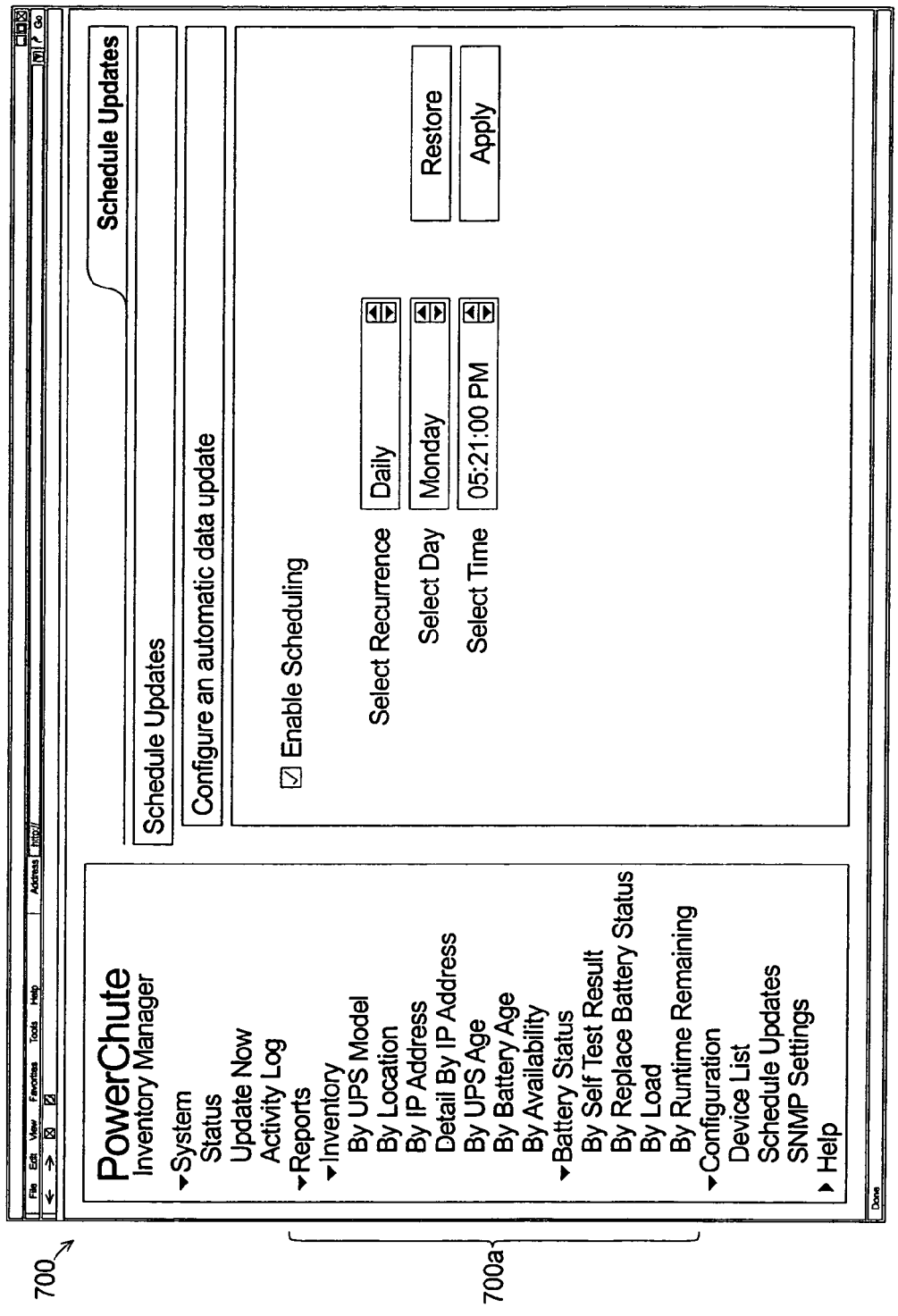
FIG. 6 is an exemplary Schedule Updates Web-page.

Alternatively and referring further to FIG. 6, the user can elect at step 250 of FIG. 2a, to schedule a database 12d update at a later time by selecting, at step 260 of FIG. 2a, the Schedule Updates tab from the Configuration Menu 500j. Selecting the Schedule Updates tab from the Configuration Menu 500j from the Device List Web-page 500 opens a Schedule Updates Web-page. FIG. 6 shows an embodiment of a Schedule Updates Web-page 700 in accordance with an embodiment of the present invention. In the Schedule Updates Web-page 700 and at step 270 of FIG. 2a, the user can enter a database 12d update cycle or number of database 12d updates that occur in a given period of time. Moreover, the user can select the day and time that the database 12d updates can occur. In maximizing the number of database 12d updates that occur in a given period of time and generating reports from the updated database 12d information, the user can minimize the time interval for which the UPS systems 18, 20, 22 and/or 24 are left unattended. Further, minimizing the time interval for which the UPS systems 18, 20, 22 and/or 24 are left unattended also minimizes failures thereof.

The user can elect to generate a number of reports at step 280 of FIG. 2a, by selecting the Reports tab, at step 290 of FIG. 2b, from any one of the following: Status Web-page 400, Device List Web-page 500, Update Now Web-page 600, or Schedule Updates Web-page 700 (FIGS. 3 through 6 respectively). In electing the Reports tab, the user is provided with a Reports menu 700a. At step 300 of FIG. 2b, the user can elect the Inventory tab from the Reports menu 700a. At step 310 of FIG. 2b, the user can select from and generate any one of a number of predetermined inventory reports. Alternatively and at step 20 of FIG. 2b, the user can elect the Battery Status tab from the Reports menu 700a. At step 330 of FIG. 2b, the user can select from and generate any one of a number of predetermined battery status reports. The inventory reports can include UPS model, UPS location, UPS internet protocol ("IP") address, UPS age, UPS battery age and/or UPS availability. The battery status reports can include: Battery Self-test Results, Replace Battery Status, Battery Status by Load and/or Battery Status by Runtime Remaining.

Figure 7:
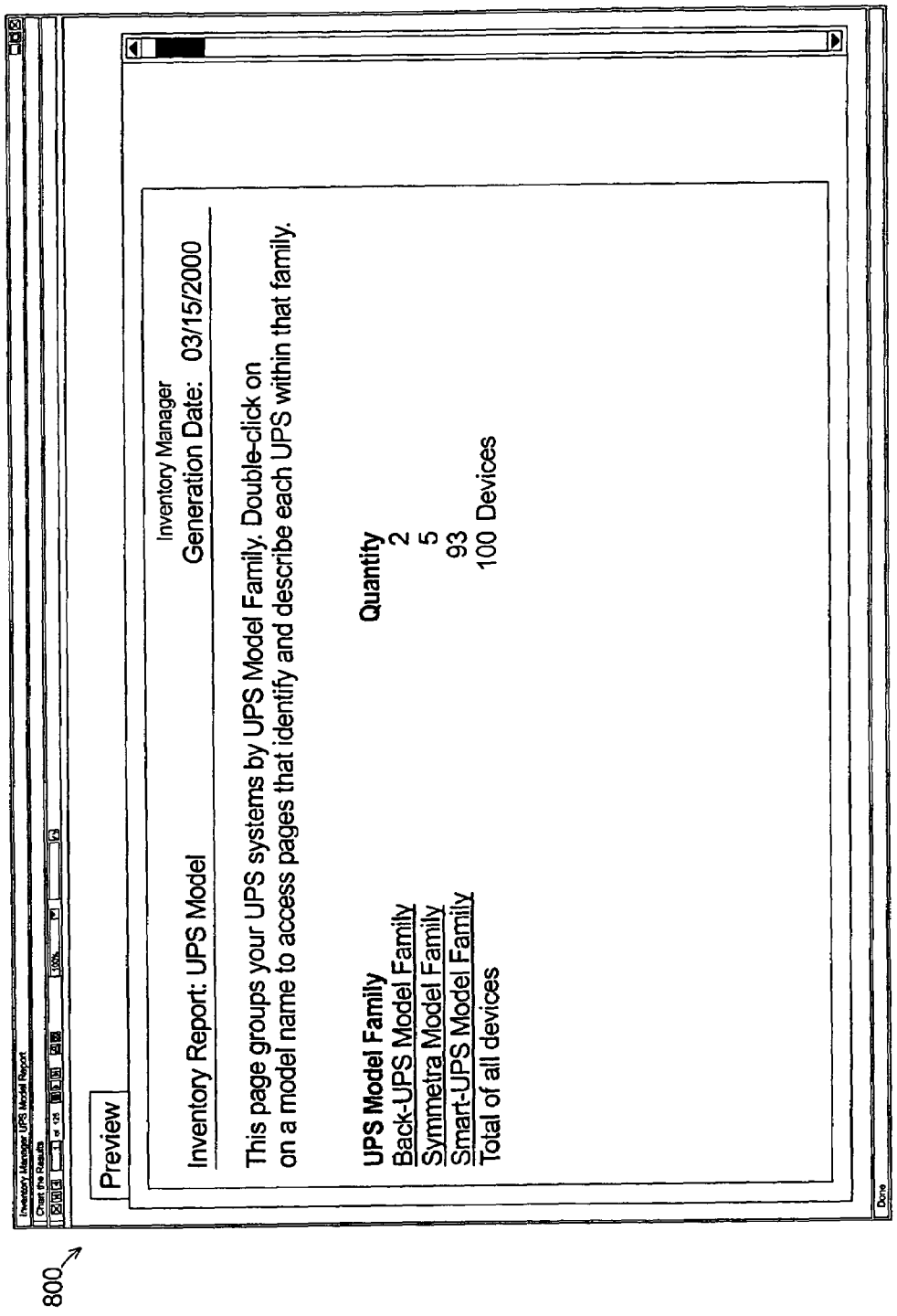
FIG. 7 is an exemplary Inventory Report including UPS model information.

FIG. 7 is an exemplary Inventory Report 800 including UPS model information which is generated in accordance with step 310 of FIG. 2b. The Inventory Report 800 further includes a number of UPS model families and associated quantities of UPS systems defined in each model family. Any one of the model families can be selected which generates another report containing detailed-information associated with the selected model family as shown in FIG. 8.

Figure 8:
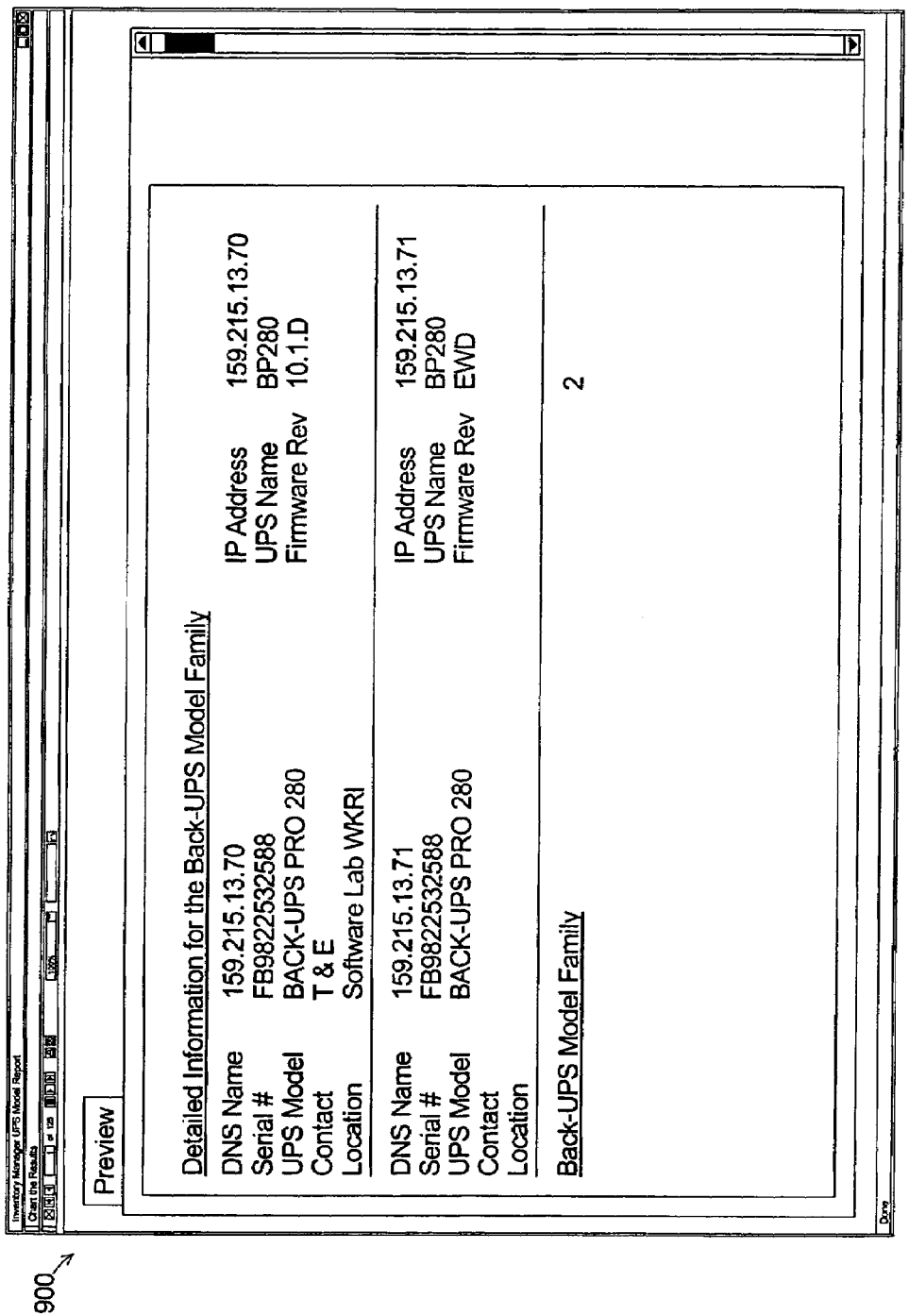
FIG. 8 is another exemplary Inventory Report including detailed information for one of the UPS model families shown in FIG. 7.

FIG. 8 is another exemplary Inventory Report 900 including detailed information for one of the UPS model families shown in FIG. 7. The detailed information can include, Domain Name Service (DNS) name, Serial No., UPS Model, Contact and Location of the UPS.

Figure 9:
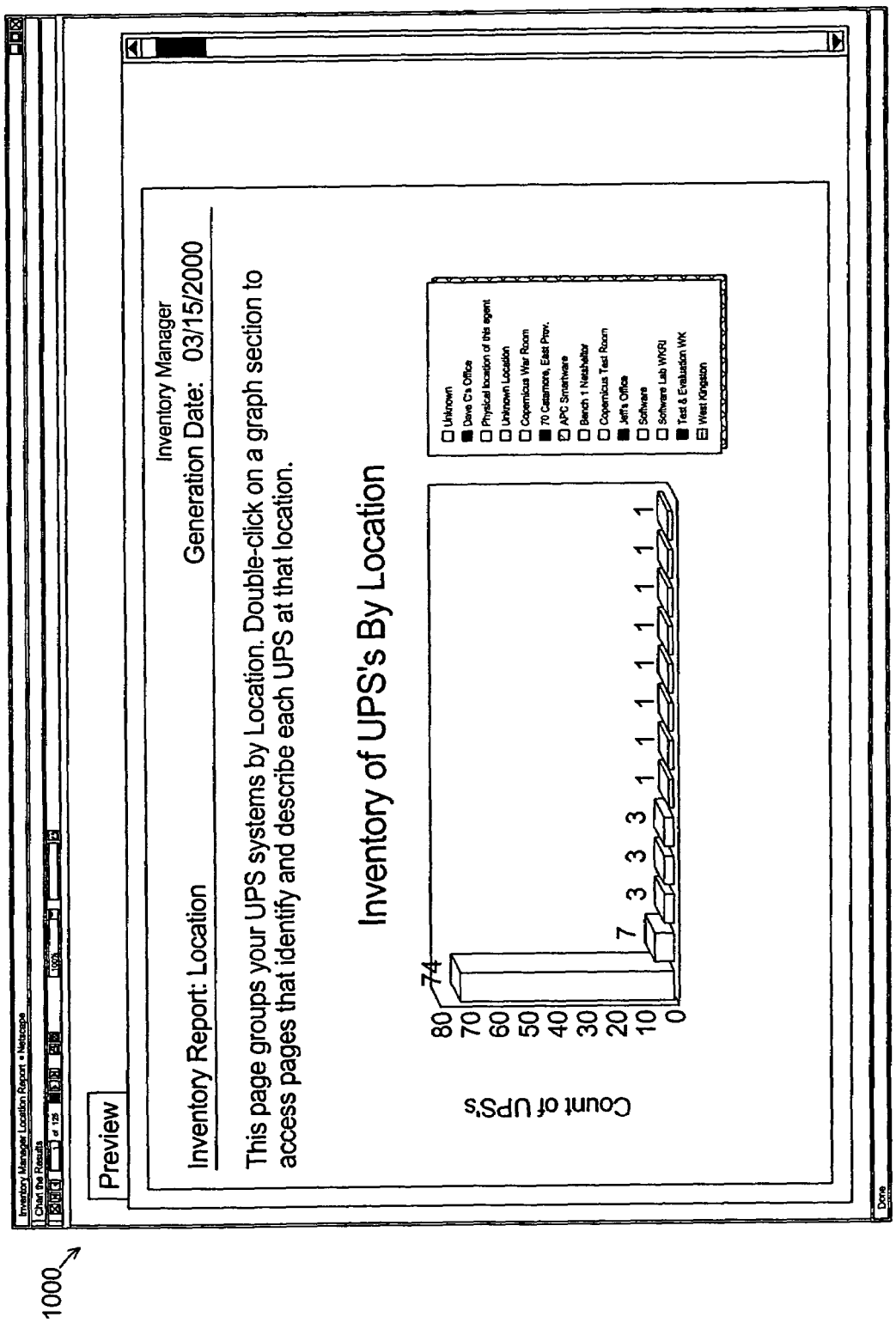
FIG. 9 is another exemplary Inventory Report including location information.

FIG. 9 is another exemplary Inventory Report 1000 including location information which is generated in accordance with step 310 of FIG. 2b. The Inventory Report 1000 further includes a number of bar graphs that describe the quantity of UPS systems residing at a predetermined location. Any one of the bar graphs can be selected which generates another report containing detailed UPS location information as shown in FIG. 10.

Figure 10:
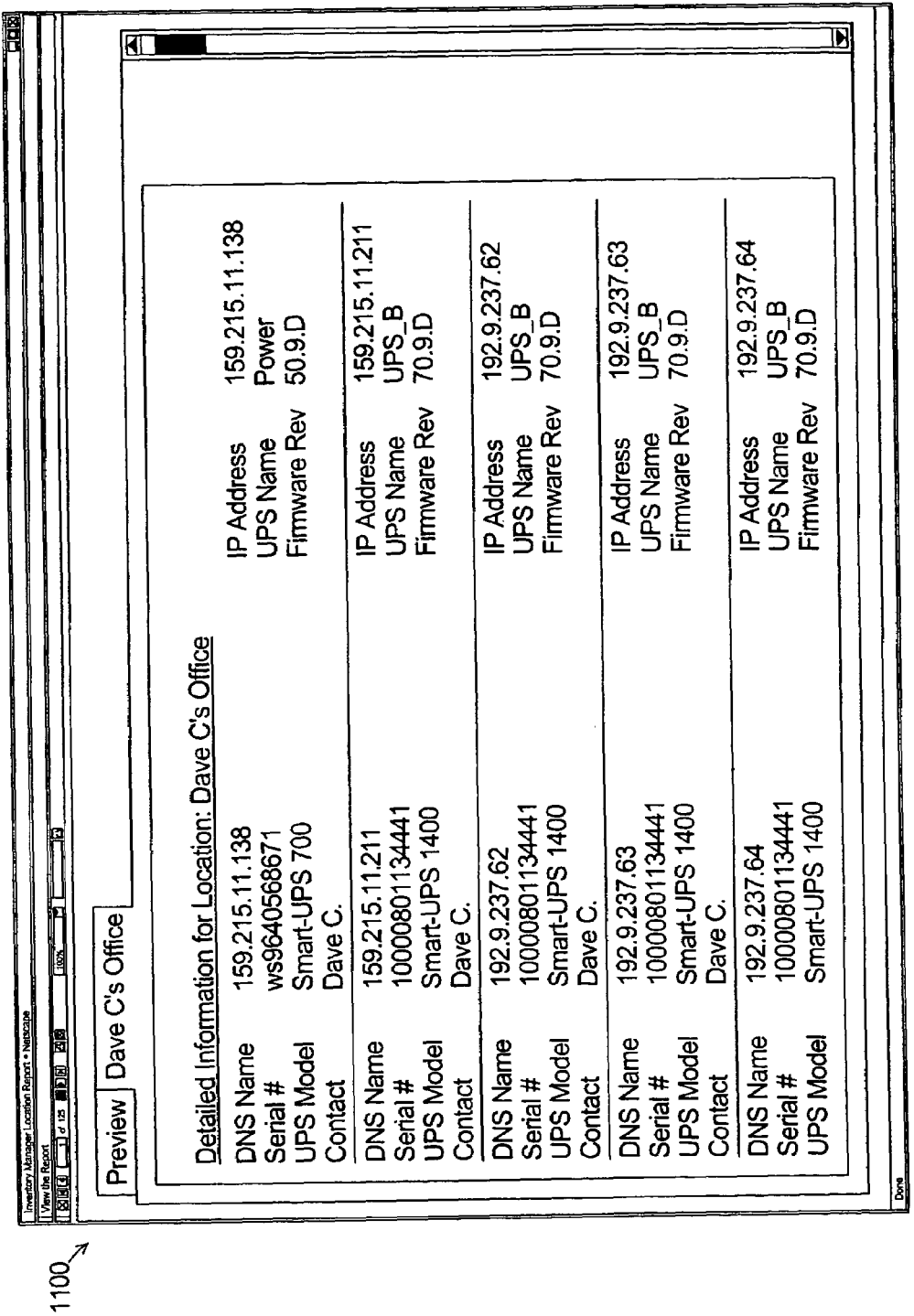
FIG. 10 is another exemplary Inventory Report including UPS location details for one of the UPS locations described in FIG. 9.

FIG. 10 is another exemplary Inventory Report 1100 including UPS location details for one of the UPS locations described in FIG. 9. The location details can include, DNS name, Serial No., UPS Model, Contact, IP Address, UPS Name and Firmware Revision.

Figure 11:
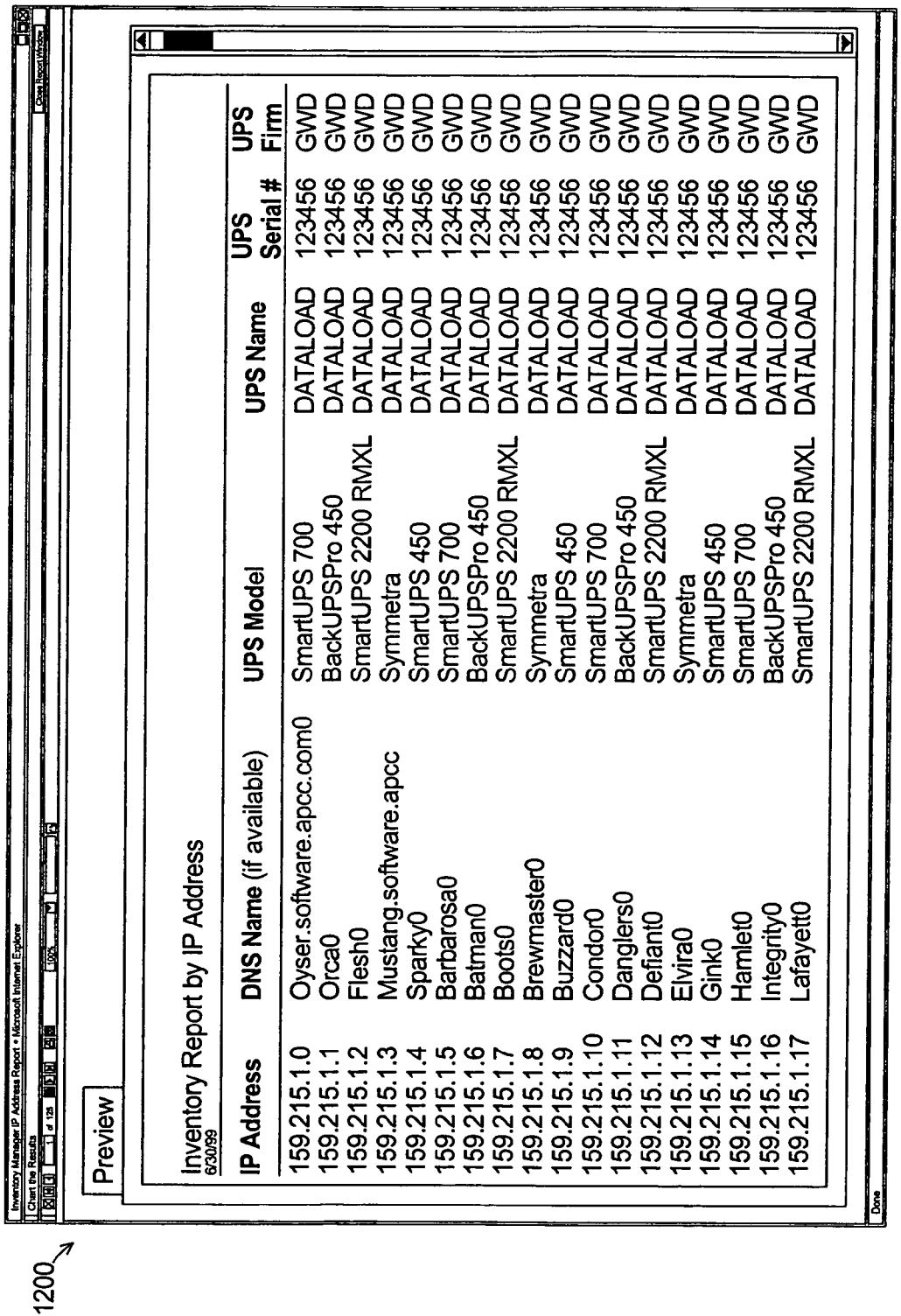
FIG. 11 is another exemplary Inventory Report including IP address information.

FIG. 11 is another exemplary Inventory Report 1200 including IP Address information, which is generated in accordance with step 310 of FIG. 2b. The Inventory Report 1200 can further include, DNS Name, UPS Model, UPS Name, UPS Serial No. and UPS Firmware Revision.

Figure 12:
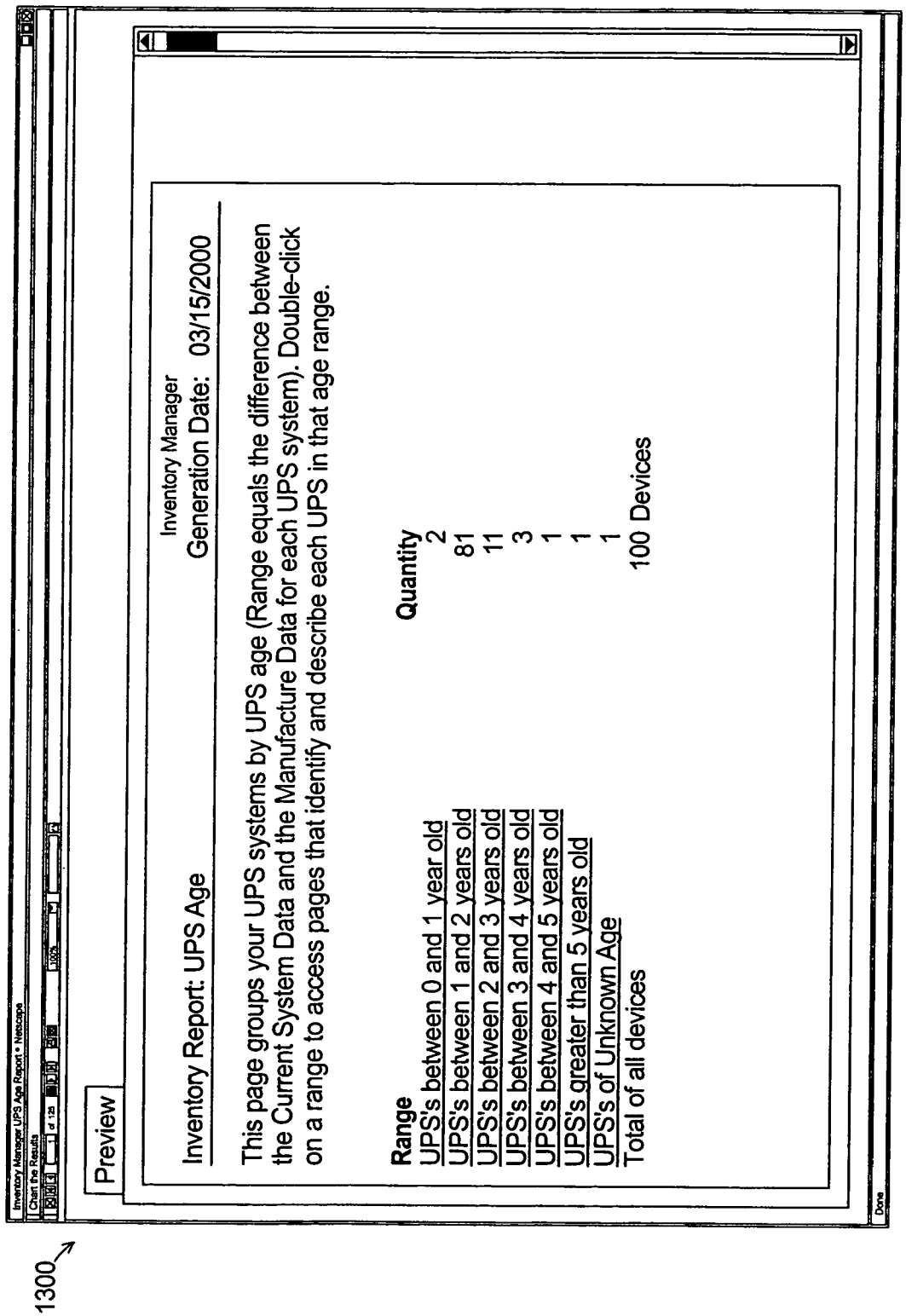
FIG. 12 is another exemplary Inventory Report including UPS age information.

FIG. 12 is another exemplary Inventory Report 1300 including UPS Age information which is generated in accordance with step 310 of FIG. 2b. The Inventory Report 1300 groups a number of UPS systems in a predetermined UPS age range. For example, age ranges can include: UPS systems between 0 and 1 year old; UPS systems between 1 and 2 years old; UPS systems between 2 and 3 years old; UPS systems between 3 and 4 years old; UPS systems between 4 and 5 years old and UPS systems of unknown age. UPS systems defined in any one of the number of predetermined age ranges can be selected which generates another report containing detailed information associated with UPS systems defined in the selected age range as shown in FIG. 13.

Figure 13:
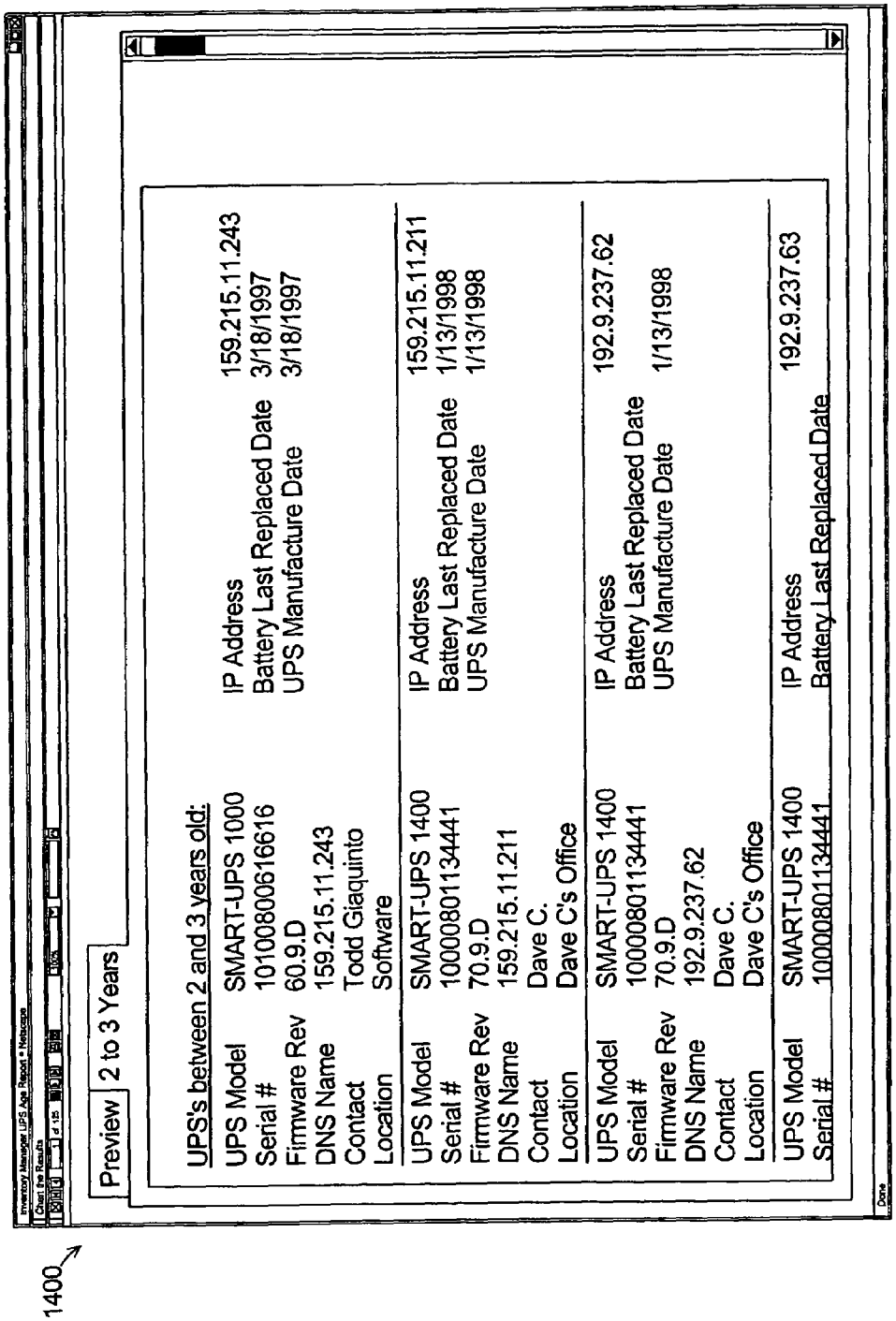
FIG. 13 is another exemplary Inventory Report including detailed information for UPS systems defined in one of the predetermined age ranges shown in FIG. 12.

FIG. 13 is another exemplary Inventory Report 1400 including detailed information for UPS systems defined in one of the predetermined age ranges shown in FIG. 12. The detailed information can include, UPS Model, Serial No., Firmware Revision, DNS name, Contact, Location, IP Address, Battery Last Replacement Date and UPS Manufacture Date.

FIG. 14 is another exemplary Inventory Report 1500 including device unavailability information which is generated in accordance with step 310 of FIG. 2b. The unavailability information identifies UPS systems that failed to respond to the most recent data update executed by the UPS manager computer. As a result of the failure to respond to the aforementioned data update operation, information included in the UPS unavailability report is only valid as of the most recent successful data update executed by the UPS manager computer.

Figure 15:
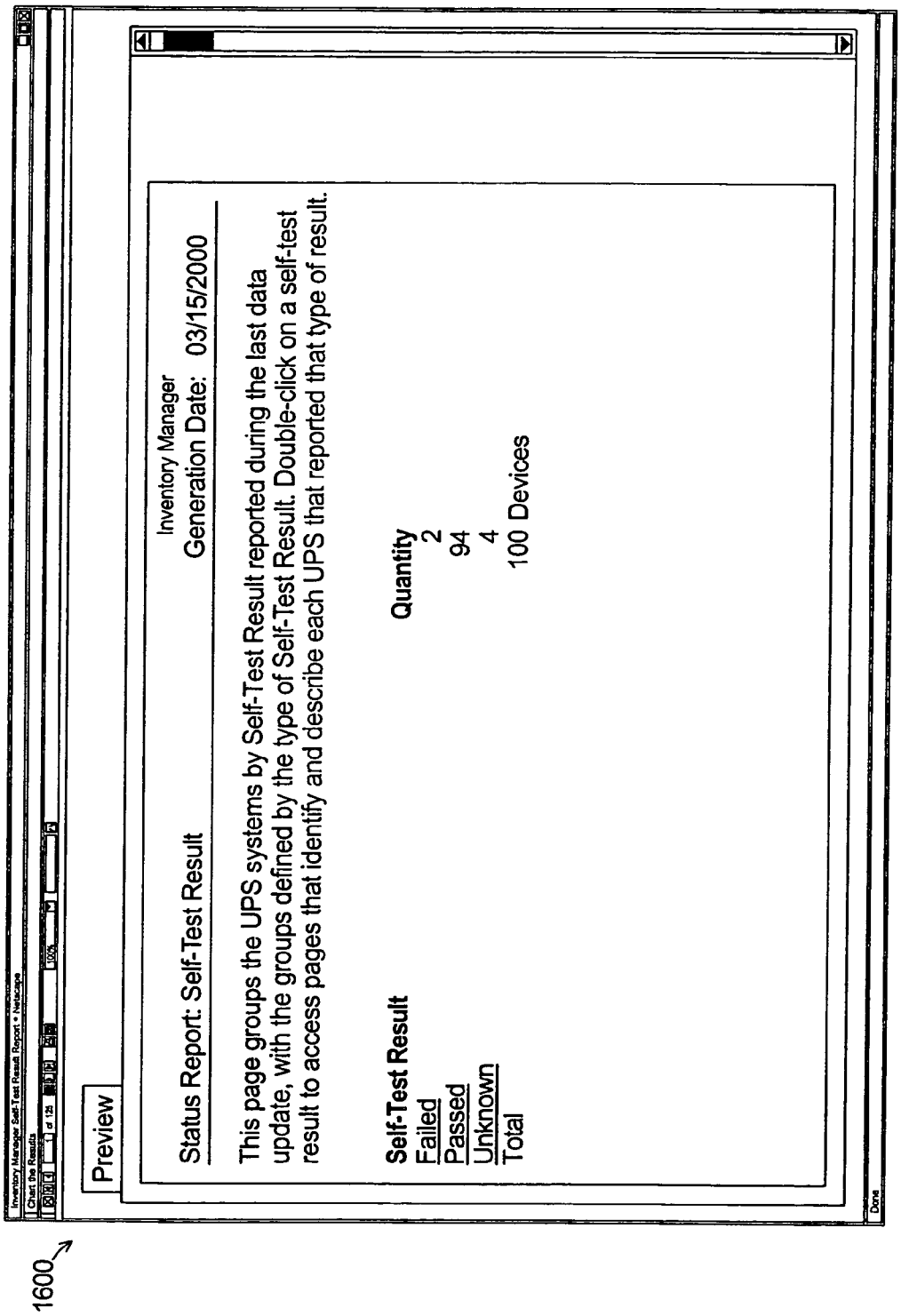
FIG. 15 is an exemplary Battery Status Report including self-test results.

FIG. 15 is an exemplary Battery Status Report 1600 including self-test results which are generated in accordance with step 330 of FIG. 2b. The FIG. 15 report groups UPS systems by the self-tests results communicated to the UPS manager computer during the most recent data update. The self-test result groups can include: Failed, Passed and Unknown. Any one of the self-test groups can be selected to generate another report containing detailed information related to UPS systems defined in the selected self-test group as shown in FIG. 16.

Figure 16:
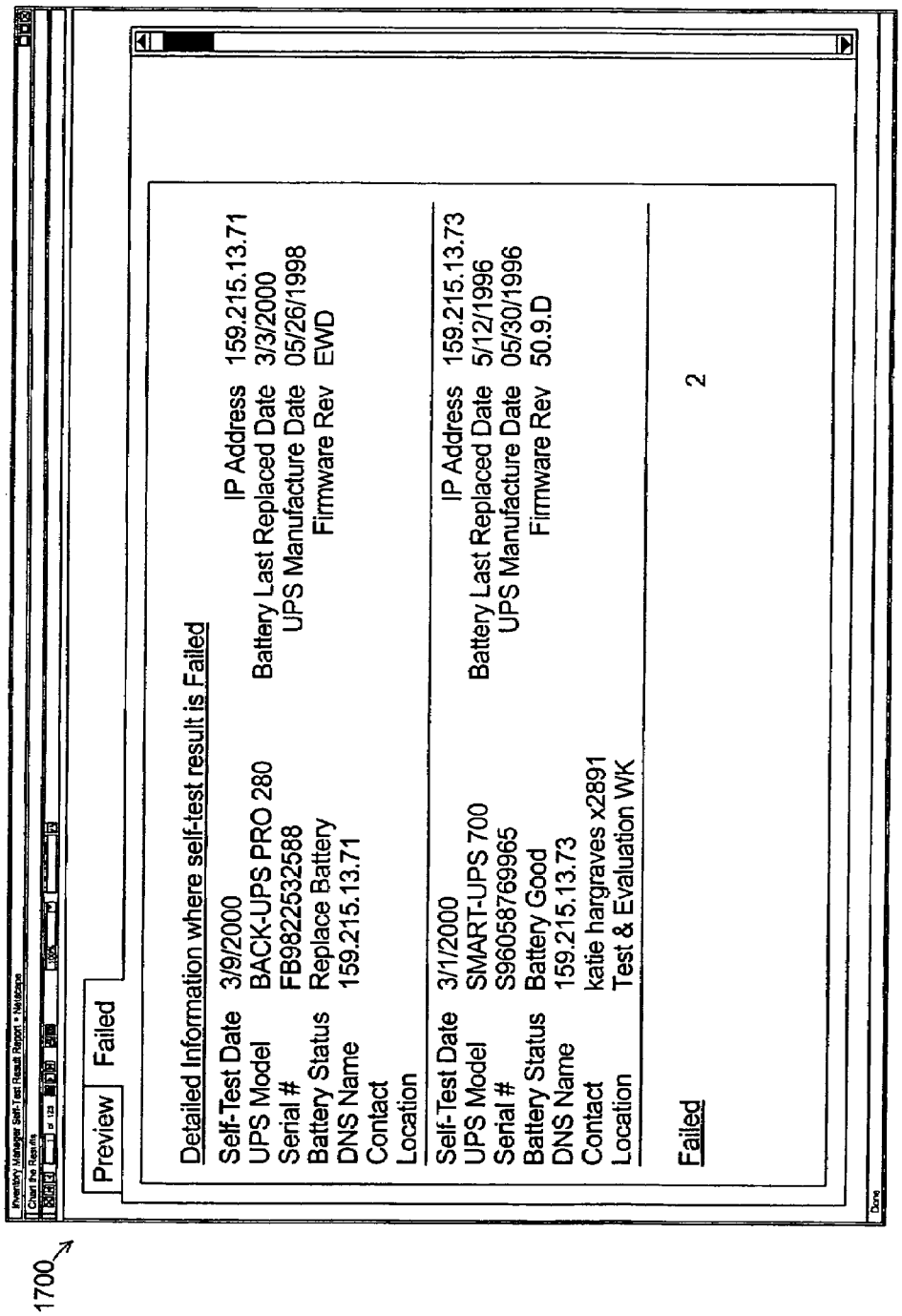
FIG. 16 is another exemplary Battery Status Report including detailed information of one of the self-test groups shown in FIG. 15.

FIG. 16 is another exemplary Battery Status Report 1700 including detailed information of one of the self-test groups shown in FIG. 15. The detailed information defined in the self test group can include: Self-test Date, UPS Model, Serial No., Battery Status, DNS name, Contact, Location, IP Address, Battery Last Replacement Date, UPS Manufacture Date and Firmware Revision.

Figure 17:
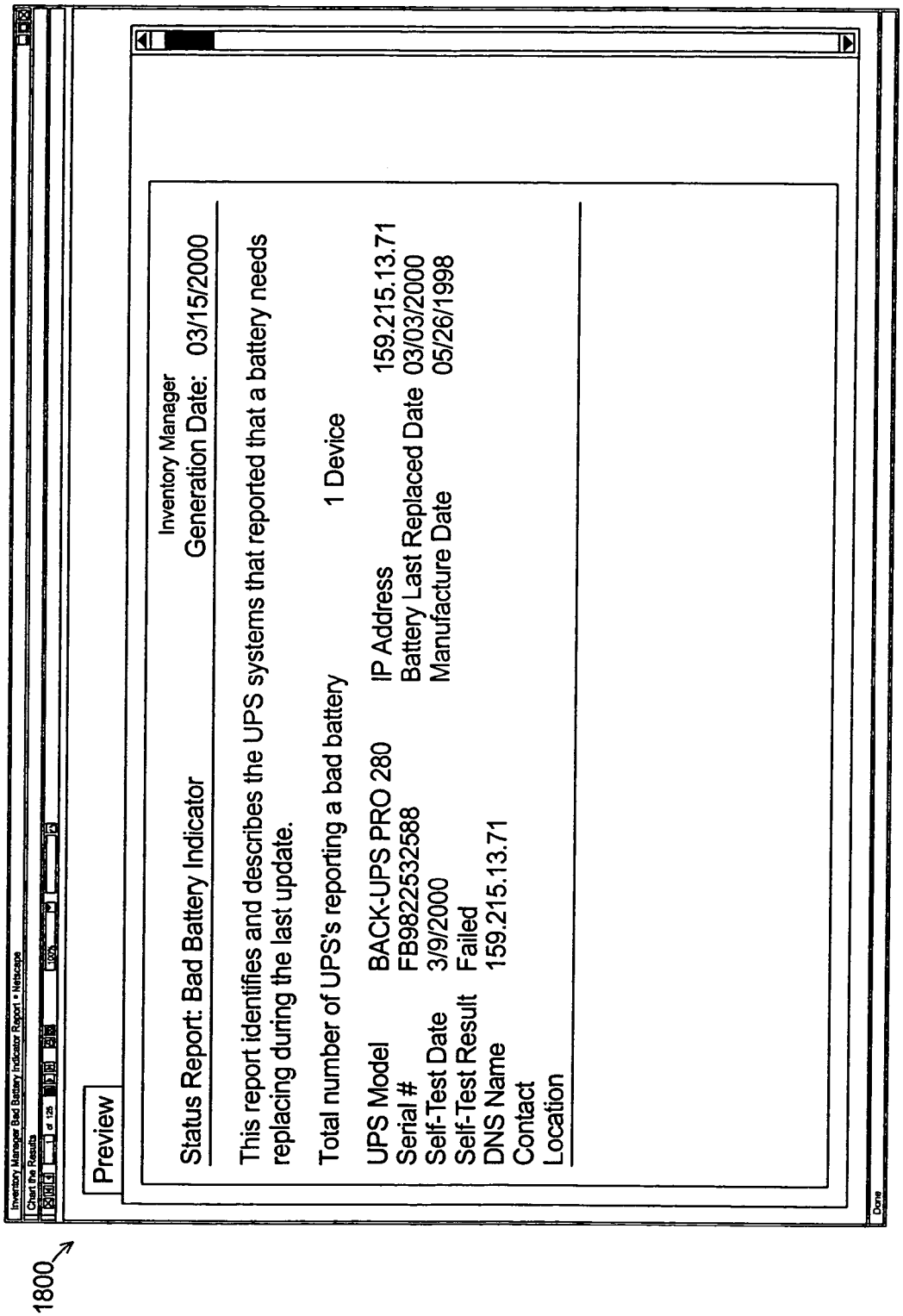
FIG. 17 is another exemplary Battery Status Report including bad battery indicator information.

FIG. 17 is another exemplary Battery Status Report 1800 including bad battery indicator information which is generated in accordance with step 330 of FIG. 2b. The Battery Status Report 1800 identifies and describes one or more UPS systems, which communicated to the UPS manager computer during the most recent update, that its battery needs to be replaced. The Battery Status report can further include other UPS system related information similar to that described above and as shown in FIG. 17.

Figure 18:
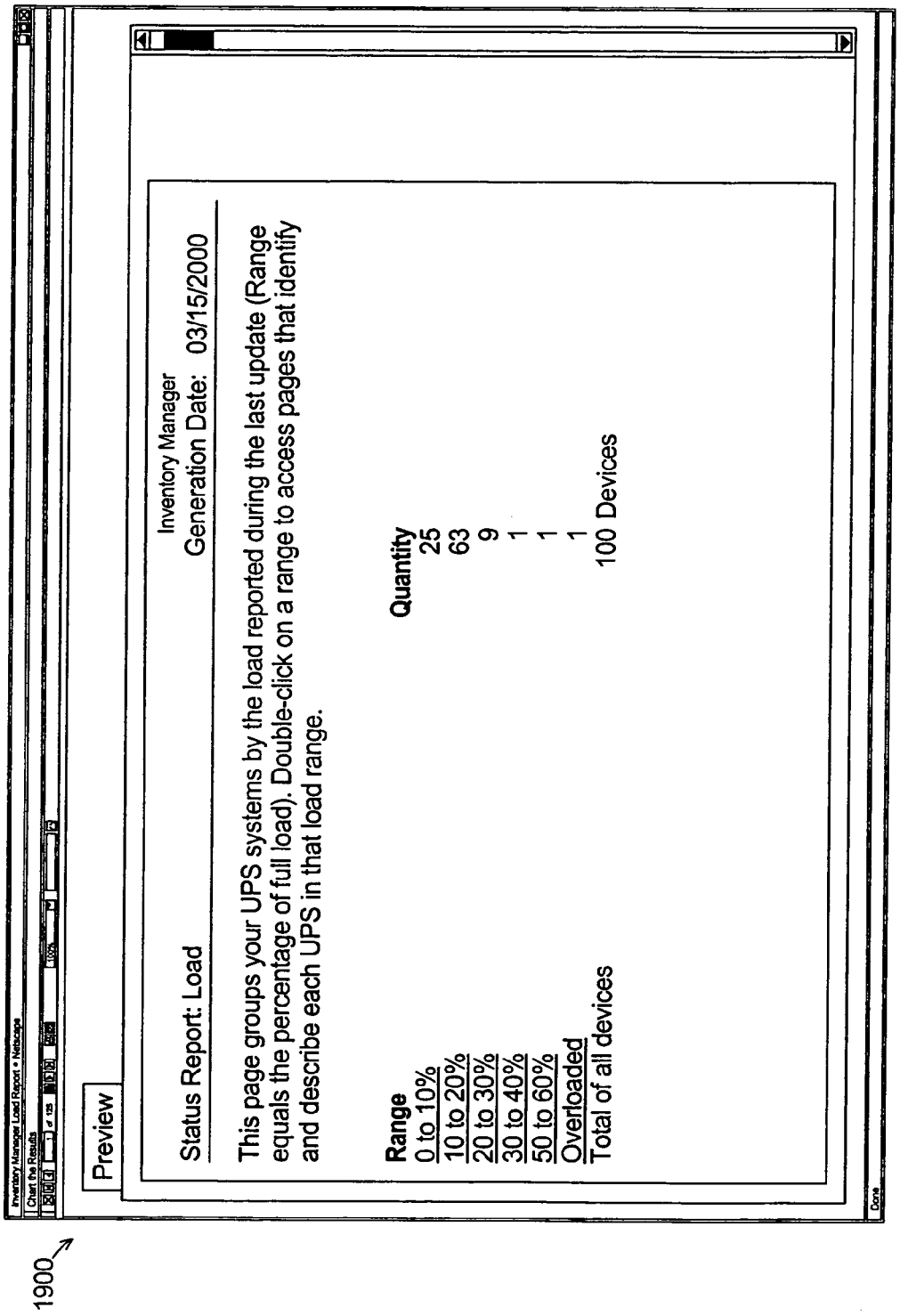
FIG. 18 is another exemplary Battery Status Report including load information.

FIG. 18 is another exemplary Battery Status Report 1900 including load information which is generated in accordance with step 330 of FIG. 2b. The Battery Status Report 1900 groups UPS systems according to a percentage of full load operation this percentage of full load operation is communicated by each UPS system to the UPS manager computer during each update. Each UPS system can be assigned to a group in accordance with this percentage of full load operation, which is communicated to the UPS manager computer. The groups can include percentage of full operation ranges from approximately: 0% to 10%; 10% to 20%; 20% to 30%; 30% to 40%; 40% to 50%; 50% to 60%; 60% to 70%; 70% to 80; 80% to 90%; 90% to 100% and Overload as shown in FIG. 18. Any one of the percentages of full operation ranges or groups can be selected to provide another report including UPS load details as shown in FIG. 19.

FIG. 19 is an exemplary Battery Status Report 2000 including UPS load details for one of the groups shown in FIG. 18. In the Battery Status Report 2000, the load details can include: Percentage-Load, Serial No., UPS Model, Firmware Revision, DNS name, Contact, Location, Runtime, IP Address and UPS Name.

Figure 20:
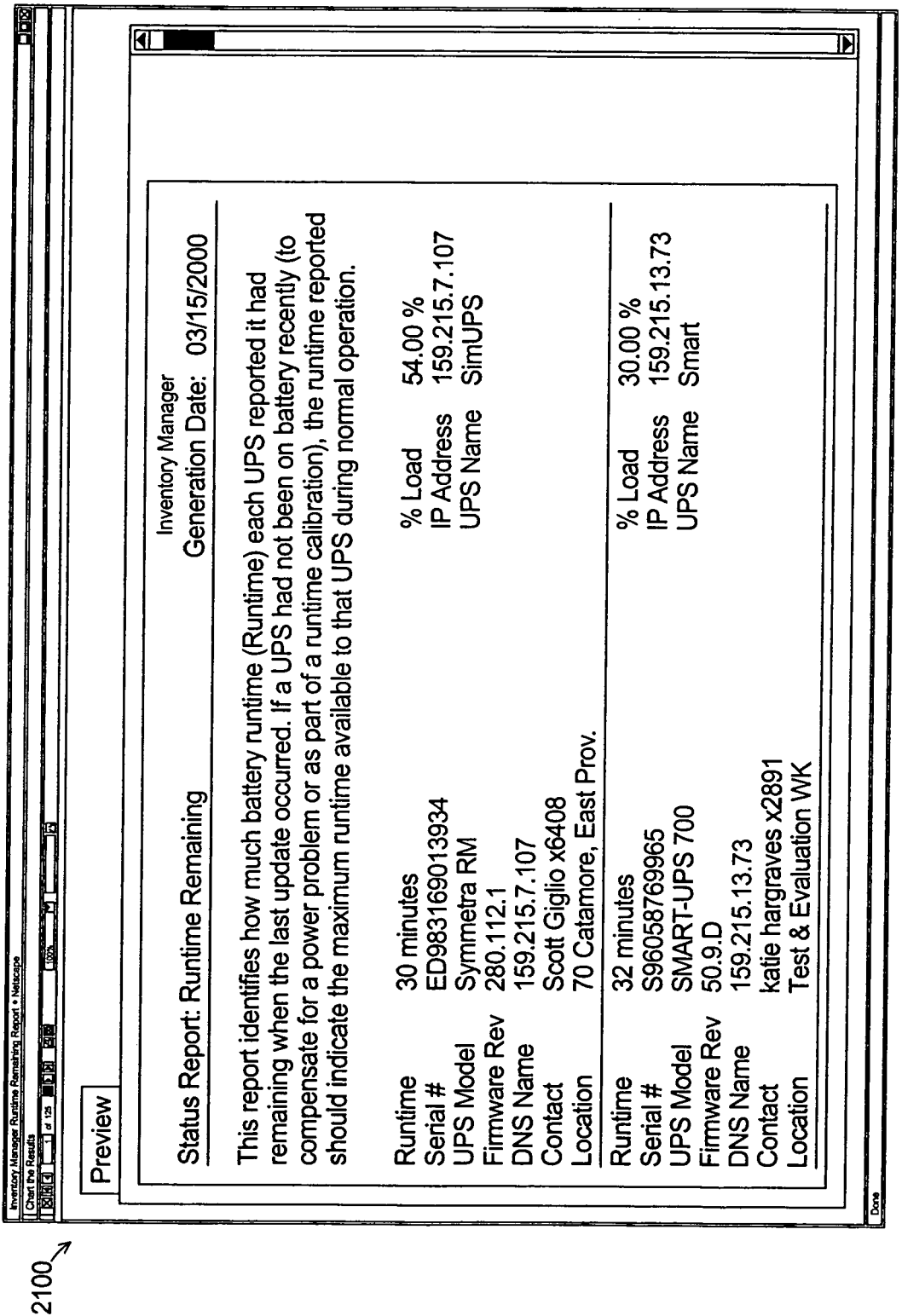
FIG. 20 is another exemplary Battery Status Report including runtime remaining information.

FIG. 20 is another exemplary Battery Status Report 2100 including runtime remaining which is generated in accordance with step 330 of FIG. 2b. The Battery Status Report 2100 indicates the amount of runtime remaining for each UPS system at the time of the most recent update by the UPS manager computer. If a UPS system has not been operating on battery recently, then the remaining runtime should be a value equivalent to the maximum available runtime of the UPS system under the load associated with the UPS.

There are many advantages to the present invention including a method and system that enables a user to manage a number of UPS systems from a central location. Further, the user can dispatch technicians to maintain and inspect a number of UPS systems based on inventory and/or status information received from each UPS system. The time interval between UPS system status updates can be minimized by adjusting the inventory and/or status information update cycle. Thus the time interval that the UPS system is left unattended can be minimized, which can also minimize system failures due to insufficient preventative maintenance or inspections.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. An uninterruptible power supply manager for managing a plurality of uninterruptible power supply systems coupled to a computer network, the uninterruptible power supply manager comprising:
   a communication port for communicating over the computer network with the uninterruptible power supply systems and a plurality of user computers;
   a storage medium that stores at least one of inventory information and status information for each of the uninterruptible power supply systems;
   a processor coupled to the storage medium and the communication port and configured to obtain the at least one of inventory information and status information from each uninterruptible power supply system over the computer network via the communication port and to send at least a subset of the inventory information and status information toward at least one user computer, coupled to the computer network, via the communication port; and
   an engine coupled to the storage medium and configured to aggregate the at least one of the inventory information and status information of the uninterruptible power supply systems;
   wherein the processor is configured to send at least a subset of the aggregated information toward the at least one computer.

2. The uninterruptible power supply manager of claim 1, wherein the inventory engine is configured to aggregate the at least one of inventory information and status information in the storage medium to generate a report.

3. The uninterruptible power supply manager of claim 2, wherein the engine is configured to arrange at least a subset of the aggregated uninterruptible power supply system information stored in the storage medium to provide a plurality of reports.

4. The uninterruptible power supply manager of claim 3, wherein the plurality of reports includes inventory reports.

5. The uninterruptible power supply manager of claim 3, wherein the plurality of reports includes battery status reports.

6. The uninterruptible power supply manager of claim 1, wherein the processor is further configured to limit attempts to communicate with the uninterruptible power supply systems.

7. The uninterruptible power supply manager of claim 6, wherein the processor is further configured to limit attempts to communicate with the uninterruptible power supply systems by specifying at least one of a time limit and a retry limit.

8. The uninterruptible power supply manager of claim 1, wherein the processor is further configured to provide at least one of the plurality of user computers with at least one of an uninterruptible power supply system status web page and a main menu.

9. The uninterruptible power supply manager of claim 1, wherein the processor is further configured to strobe the uninterruptible power supply systems associated with a range of computer network addresses defined by starting and ending addresses to determine computer network addresses of the uninterruptible power supply systems; and store the computer network addresses determined from the strobing.

10. The uninterruptible power supply manager of claim 1, wherein the processor is further configured to:

strobe the uninterruptible power supply systems associated with a partial computer network address to determine computer network addresses of the uninterruptible power supply systems; and store the computer network addresses determined from the strobing.

11. The uninterruptible power supply manager of claim 1, wherein the processor is further configured to update the uninterruptible power supply system information.

12. The uninterruptible power supply manager of claim 11, wherein the processor is further configured to update the uninterruptible power supply system information on a predetermined cyclic schedule.

* * * * *